United States Patent
Moebius et al.

(10) Patent No.: US 7,065,413 B2
(45) Date of Patent: Jun. 20, 2006

(54) METHOD FOR PRODUCING SOFTWARE FOR CONTROLLING MECHANISMS AND TECHNICAL SYSTEMS

(75) Inventors: Volker Moebius, Dresden (DE); Knut Grossmann, Dresden (DE)

(73) Assignee: Technische Universitaet Dresden, Dresden (DE)

( * ) Notice: Subject to any disclaimer, the term of this patent is extended or adjusted under 35 U.S.C. 154(b) by 649 days.

(21) Appl. No.: 10/009,010

(22) PCT Filed: Apr. 3, 2001

(86) PCT No.: PCT/DE01/01331

§ 371 (c)(1),
(2), (4) Date: Apr. 4, 2002

(87) PCT Pub. No.: WO01/75535

PCT Pub. Date: Oct. 11, 2001

(65) Prior Publication Data

US 2003/0040814 A1    Feb. 27, 2003

(30) Foreign Application Priority Data

Apr. 4, 2000 (DE) ............................... 100 17 708

(51) Int. Cl.
G05B 11/01 (2006.01)
(52) U.S. Cl. ............................ 700/19; 700/18; 700/23; 700/86; 700/87; 700/88; 712/4; 712/213; 712/219; 717/1; 717/110; 717/114; 717/127; 717/131; 382/304
(58) Field of Classification Search .................... 700/1, 700/2, 4, 5, 18–19, 23, 27–30, 42–43, 86–88, 700/262; 712/1, 4, 213, 219; 717/1, 110, 717/114, 119, 127, 131; 382/304
See application file for complete search history.

(56) References Cited

U.S. PATENT DOCUMENTS

| | | | | |
|---|---|---|---|---|
| 4,858,101 A | * | 8/1989 | Stewart et al. | 700/2 |
| 5,193,189 A | * | 3/1993 | Flood et al. | 718/103 |
| 5,545,962 A | * | 8/1996 | Wakui | 318/677 |
| 6,581,048 B1 | * | 6/2003 | Werbos | 706/23 |

FOREIGN PATENT DOCUMENTS

| | | |
|---|---|---|
| DE | 37 43 438 | 6/1989 |
| DE | 41 24 542 | 2/1992 |
| DE | 44 07 334 | 9/1995 |
| DE | 195 13 801 | 10/1996 |
| EP | 0 424 869 | 5/1991 |
| EP | 0 487 117 | 5/1992 |
| WO | WO-94/12914 | 6/1994 |
| WO | WO-98/40796 | 9/1998 |

* cited by examiner

*Primary Examiner*—Ramesh Patel
(74) *Attorney, Agent, or Firm*—Jordan and Hamburg LLP

(57) ABSTRACT

In a method for controlling mechanisms or technical systems, the mechanisms or technical systems to be controlled are stored in a controller with their states, and with associated signal formers of sensors and actuators, whereby starting from a defined reference state at the onset of the activation of the controller, the actual states signaled by the technical system via the sensors are continuously compared with the specified state, the specified state being stored in the controller, and, based on this comparison, every deviation from the specified state is identified in the technical system, and, when initiated, a new instruction that changes the state of the mechanisms or of the technical system updates the specified state for the comparison and monitors the time till the acknowledgment of the new state, and sensor signals and comparable information exclusively serve the state identification of elementary functions and state changes exclusively ensue upon the initiation of elementary instructions.

17 Claims, 22 Drawing Sheets

85

| (1) | (2) | (3) | (4) |
|---|---|---|---|
| ELEMENTARY FUNCTION | SIGNAL | | SYSTEM TIME |
| NAME | IDENTIFIER | | STARTING TIME + MS |
| A11 | E1 | 1 | 123,456 10E3 |
| A12 | E1 | 0 | 123,789 10E3 |
| A11 | E2 | 0 | 223,789 10E3 |
| A21 | E1 | 1 | 323, 789 10E3 |
| A22 | E2 | 0 | 423, 789 10E3 |
| A22 | E1 | 1 | 523,789 10E3 |
| A21 | E2 | 0 | 823,789 10E3 |
| A23 | E1 | 0 | 923,789 10E3 |
| A31 | E2 | 1 | 123,789 10E4 |
| A11 | E1 | 1 | 323,789 10E4 |
| • | • | • | • |
| • | • | • | • |
| • | • | • | • |
| • | • | • | • |
| • | • | • | • |

FIG.14

| INSTRUCTION NAME | DOOR OPEN | INSTRUCTION CONTENT | OPEN DOOR | |
|---|---|---|---|---|
| INSTRUCTION SEQUENCE | BARRIER TO BE SET | | BARRIER TO BE CANCELED | |
| INSTRUCTIONS TO BE ACTIVATED | DURING THE CARRYING OUT | AFTER THE INSTRUCTION HAS BEEN CARRIED OUT | DURING THE CARRYING OUT | AFTER THE CARRYING OUT |
| EF2-B1<br>1.) UNLOCK BOLT | EF1-B1<br>OPEN DOOR MOVER | | | EF1-B1<br>OPEN DOOR MOVER |
| EF1-B1<br>2.) OPEN DOOR MOVER | EF2-B2<br>SET BOLT | EF1-B2<br>SET BOLT | | |
| | | | | |

| INSTRUCTION NAME | DOOR CLOSED | INSTRUCTION CONTENT | CLOSE DOOR | |
|---|---|---|---|---|
| INSTRUCTION SEQUENCE | BARRIER TO BE SET | | BARRIER, WHICH IS TO BE REMOVED | |
| INSTRUCTIONS TO BE ACTIVATED | WHILE THE INSTRUCTION IS BEING CARRIED OUT | AFTER THE INSTRUCTION HAS BEEN CARRIED OUT | WHILE THE INSTRUCTION IS BEING CARRIED OUT | AFTER THE INSTRUCTION HAS BEEN CARRIED OUT |
| EF1-B2<br>1.) CLOSE DOOR MOVER | EF1-B2<br>SET BOLT | | | EF2-B2<br>SET BOLT |
| EF2-B2<br>2.) SET BOLT | EF1-B1<br>OPEN DOOR MOVER | EF1-B1<br>OPEN DOOR MOVER | | |
| | | | | |

FIG.16

SUB-MENU ERROR REACTION

INSTRUCTION = EF1-B2 CLOSE DOOR MOVER

CHARGING BEFORE CARRY OUT INSTRUCTION

REACTION TO: EF2

SIGNAL VECTOR: E1=1

ERROR INSTRUCTION: EF1-B1 OPEN DOOR MOVER

CLEARING AFTER CARRYING OUT INSTRUCTIONS

FIG.18

STATUS OF CLOSING FACILITY: S1 (OPERATE DOORS INDEPENDENTLY) — 91, 92

| INVENTORY OF INSTRUCTIONS | INSTRUCTION DEVICE | INSTRUCTION LIBRARY |
|---|---|---|
| OPEN DOOR 1 | DOOR1 SWITCH1 | T1-DOOR OPEN |
| CLOSE DOOR 1 | DOOR1 SWITCH2 | T1-DOOR CLOSED |
| OPEN DOOR 1 | DOOR2 SWITCH1 | T2-DOOR OPEN |
| CLOSE DOOR 1 | DOOR2 SWITCH2 | T2-DOOR CLOSED |

STATUS OF CLOSING FACILITY: S2 (DOORS SYNCHROUPUSLY) — 93

| INVENTORY OF INSTRUCTIONS | INSTRUCTION DEVICE | INSTRUCTION LIBRARY | |
|---|---|---|---|
| DOOR OPEN | CHANGE FROM DOOR SWITCH 1 OR 2 | PARALLEL INSTRUCTION | T1-DOOR OPEN T2-DOOR OPEN |
| DOOR CLOSED | CHANGE FROM DOOR SWITCH 1 OR 2 | PARALLEL INSTRUCTION | T1-DOOR CLOSED T2-DOOR CLOSED |

STATUS OF CLOSING FACILITY: S3 (DOOR LOCK)

| INVENTORY OF INSTRUCTIONS | INSTRUCTION DEVISE | INSTRUCTION LIBRARY | WHILE CARRYING OUT INSTRUCTIONS | AFTER INSTRUCTIONS HAVE BEEN CARRIED OUT |
|---|---|---|---|---|
| OPEN DOOR 1 | DOOR 1 SWITCH 1 | DOOR OPEN | LOCK DOOR 2 | LOCK DOOR 2 |
| CLOSE DOOR 1 | DOOR 1 SWITCH 2 | DOOR CLOSE | LOCK DOOR 2 | |
| OPEN DOOR 2 | DOOR 2 SWITCH 1 | DOOR OPEN | LOCK DOOR 1 | LOCK DOOR 1 |
| CLOSE DOOR 2 | DOOR 2 SWITCH 2 | DOOR CLOSE | LOCK DOOR 1 | |

FIG.21

METHOD FOR PRODUCING SOFTWARE FOR CONTROLLING MECHANISMS AND TECHNICAL SYSTEMS

BACKGROUND OF THE INVENTION

The invention refers to a method for the control of mechanisms and technical systems, as well as to the devices of an electronic control to be designed for that and a method for the creation of the control software.

From DE 44 07 334 A1 a method is known for the creation and representation of controls by that controls can be easily graphically designed. The desired function of the control is graphically entered into a computer as an event-driven network of symbols with freely choosable connections, or is represented by a computer. The network transformed into a machine readable form can be used by the computer or a separate control computer as control programme. The method is suitable for programmable logic controllers and DDC-systems.

From DE 195 13 801 A1 a method is known for the automatic generation of a control for a process in that a non-deterministic automaton is determined that describes all physically possible behaviours of the control, in which the permissible state transitions of the process to be influenced by the control are described, in which the automaton is set such that it fulfils given safety requirements, in which the automaton is set such that it fulfils the function of the system consisting of the control and the process. The method uses the programming language CSLxt to describe the components of the system specification. For the specification of the process model, not the state transitions are described in detail, but so-called predefined qualitative constraints are used that serve to automatically generate the control.

It is disadvantageous that the description of state transitions can be faulty on a higher language level and a later correction of the control cannot be made easily.

Furthermore, programmable logic controllers (PLCs), hardware PLCs software PLCs, programming systems and programming languages, Simatic S7 programming to the IEC 1131-3 standard, tandard programming languages: ladder diagram, logic diagram, selection logic, Structured Text are known.

It is disadvantageous in the state-of-the-art that using Boolean algebra, in principle, conditions resulting from inputs (sensors) are formulated to set outputs (actuators) that are continuously recalculated cyclically. This programming approach has developed historically. Evidence of this state is produced by the fact that according to the generally accepted standard, the "ladder diagram" can still be used as a programming language.

For all the CAE support by graphic surfaces and high-level languages, basic imperfections have remained such as confusingness of the programme and its individual character moulded by the programmer, never complete testability of the programme concerning its functionality, because the result of the cyclic calculations can be influenced by combinatory and time-dependent accidents, and the difficult design of sophisticated error reactions.

It is the objective of the invention to describe a control for mechanisms or technical systems that solves the control problem without use of conditions of Boolean algebra whereby a clearly arranged programme free of individual mouldings and completely testable is to be created.

BRIEF SUMMARY OF THE INVENTION

The essence of the invention is that derived from the functionality of the mechanism or technical system to be controlled, particularly with its development, using technical means the functionality of the device to be controlled is filed, managed and updated in a control computer, which is designed to be a control, as a complete representation of the desired state of the system according to the instructions and a comparison of that desired state with the actual state of the technical device is made via the sensor signals transmitted. This desired/actual state comparison is continuously made for all sensor signals of the system to be controlled. If there are deviations of the actual state from the desired state, prepared algorithms are processed and prepared useful decisions are activated. Thus, each sensor signal is compared with exactly one desired signal and this comparison is solely made to identify the state of the technical system. Changes in state are effected exclusively through instructions on a functional language level. These instructions are managed in a special domain of the control. When an instruction is started, the desired state in the representation is updated and the change of the actual state of the technical system that fulfils the instruction is checked after a predetermined time.

The devices to be controlled are stored in the control in form of their elementary functions with the states of these elementary functions defined according to the instructions and the appropriate signal representations of the sensors and actuators. As a result, starting from a defined reference state at the beginning of the activation of the control for all elementary functions, a continuous comparison of the actual states signalized by the technical system through the sensors with the desired state stored in the control is made. According, each deviation in the system to be controlled from the desired state according to the instructions is detected. As a result, a new instruction that changes the state of the technical system updates when started and the desired state for making the comparison and supervises the time period until the new state defined by that instruction is signalized on the base of also stored permissible transition times. As a result, sensor signals and comparable information exclusively serve for the identification of the state. Furthermore, state changes take place exclusively through the start of instructions that are freely defined for that to occur on a logical-functional language level and to which the elementary instructions defined by sensor and actuator signals are assigned.

Advantageously the states of all elementary functions are managed as actual desired states with the appropriate actuators and sensors in a programme module referred to as EF-controler. Thus each change in state of the technical system that is detected by the sensors is evaluated for its equivalence to the desired state managed in the control.

A state of an elementary function of the signal representation which describes the state that is not equivalent to the desired state is advantageously transmitted to a programme module referred to as "not-desired state evaluator", in which for selected states of elementary functions reaction instructions are stored that are started on equivalence to the state transmitted for check. As a result, in all cases specific error messages are created.

To an instruction as a set of instructions, the new desired states of the sensors and actuators, the times of transition until the new desired state and the reaction instructions for selected state messages to be started in case of deviations, in each case classified as reaction instructions to be set and deleted before the start and after the execution, respectively, are assigned. As a result, advantageously a programme module referred to as "instruction editor" undertakes the organization required for that in the system. Furthermore, in this programme module the release of a subsequent instruction in case of instruction sequences after signalling of the execution of the preceeding instruction and the organization of parallel instructions by temporary starting of parallel execution sequences according to the demand is realized.

Advantageously, in the organized control system sensor signals and other information to be controlled are integrated into a continuous data word in a programme module here referred to as "state monitor". As a result, the address of the appropriate elementary function in the EF-controler maintains assigned to the signals and for executing the comparison, each desired signal is faced by the actual signal in equal structure so that a desired signal/actual signal comparison is made possible that can be carried out very effectively by a programme. As a result, any deviation of a signal after transmission for evaluation is entered as the new comparison state so that the comparison is always made to the state evaluated last. Furthermore, each change in state is evaluated only once. As a result, the comparison of the desired and actual signals is made directionally and after an interruption for the evaluation of a deviation the comparison is continued at the signal succeeding the interruption place. This ensures that each state change that is sufficiently long in time can be detected and evaluated.

In a control system organized in this way each recorded state change is recorded by the programme module state monitor in an event-time protocol and stored there. As a result, in the simplest way process parameters defined thereby become accessible so that also, e.g., signal vibrations can be detected and, if necessary, filtered out.

Advantageously, the programme modules that are subject to real-time processing requirements—instruction editor, EF-controler, state monitor and not-desired state evaluator—are combined to a functional unit that is referred to as "execution computer", for which a special processor is used. The instructions formulated only on the logical-functional language level of the actual application programmes are organized in a second functional unit referred to as "instruction computer", which is not subject to real-time processing requirements. As a result, in case of a bigger and more variable instruction volume the instruction computer usefully has an own processor and here also the communication can be designed to be comfortable.

Instructions transmitted from the instruction computer to the execution computer are advantageously executed without being checked. As a result, the execution computer carries out each action autonomously. Therefore, in the instruction computer blocking lists are managed on the logical-functional instruction level for the mutually exclusive states, which take on that proportion of blockings that is determined on the process and machine sides. As a result, here in the instruction computer an application process instruction (in addition to the information which instructions have to be transmitted to the execution computer) also defines for which other application instructions blockings are to be set or deleted during or after the execution.

The execution computer can execute a received instruction autonomously. As a result, the instruction computer makes the checked subsequent instruction available to the execution computer in an instruction buffer as intermediate storage. After that, the instruction computer updates the state in the instruction computer to the condition that will be after the execution of this instruction is made available. Furthermore, the subsequent instruction is checked in the instruction computer already during the execution of the preceeding instruction in the execution computer so that as a rule a faster programme run can be achieved. Non-compatible instructions are identified and marked as not permissible already in the instruction computer and such an instruction is not started. If the prepared instruction is permissible, the state expected for the check of the instruction in the instruction computer will appear, error-free execution provided. Furthermore, programme running is continued while in case of an error, a reset is carried out to the state with regard to the current instruction as error state.

When producing a control programme the user of this control is advantageously supported by a dialogue with a development programme. As a result, the first description of the system to be controlled demands information on the hierarchical functional structure of the system. The lower end of this structure, in each case, is regarded as elementary function and each elementary function has to be defined in its instruction states also within a dialogue. Furthermore, the sensor signals, actuators, control times for the transition between the states according to the instructions and a reference state for the start has to be assigned. The definition of the integration of more complex partial systems can also take place. As a result, the user of the control system provides only the above primary data and the control development programme therefrom generates the system elementary function memory, the EF-controller and the signal vector for the state monitor. Thus the technical system can already be put into operation, checked for error-free signal definition in the reference state, controlled with the defined elementary functions and be tested and checked as far as permissible with regard to single instructions.

For such a dialogue-supported system the application instructions are advantageously produced in such a way that in an instruction library elementary functions from the previously defined elementary functions are assigned to the near-to-process application instructions as single instructions, parallel or serial instruction sequences. In addition, the blocking conditions on the instruction level in the instruction computer and, for the instruction set to be transmitted to the execution computer also the reaction instructions for selected deviations combined with suitable error messages, which have to be entered into the not-desired state evaluator, are defined.

For a control system with that structure changes of the elementary functions maintain locally limited. Any time, also with calculable local effect, new application instructions, blocking conditions or error reactions can be entered, extended or changed, or without any reaction to already defined programmes, specified by the allocation of state data for the system, new assignments of instructions and instruction conditions can be carried out.

The logical-functional structure of each programme produced in this way can be completely checked. Important additional process information is accessible through the event-time protocol. An unambiguous cause is diagnosed for each malfunction without any additional measures. The state of the system can be completely indicated at any point in time in a defined manner. A copy with the same capability to describe the system to be controlled can be maintained in an external control computer that has been connected into a network with the system. The elementary functions and the defined instructions can serve as a direct functional base for the visualization of the systems and processes to be controlled. Furthermore, the communication of the control programme with other intelligent programme modules, such as simulations for process optimization, can easily be organized.

For small-scale controls with a limited instruction volume the modules of the execution computer and of the instruction computer can be based on a principally equal structure and function of the control be enclosed in a control hardware module with fixed instruction sets, which are activated with simple operating elements whereby an external computer can be coupled over a suitable interface so that the read-in of the control software and if necessary, also a comfortable communication and diagnosis can be realized. Hence comparable control characteristics and comfort at a reasonable price can be achieved.

The solution according to the invention avoids the imperfections of the state-of-the-art by a programming approach that is unusual up to now, which makes use of the designed, hence impressed functionality of the system. New means completely substitute the signal interconnection using Boolean algebra in condition equations to set outputs.

BRIEF DESCRIPTION OF THE DRAWINGS

Accompanying the specification are figures which assist in illustrating the embodiments of the invention, in which:

FIG. 14 structure of an event-time protocol;

FIG. 16 an example of the definition of application instructions;

FIG. 18 an example of the determination of error instructions;

FIG. 21 all data for an instruction library of an instruction computer according to FIGS. 19 and 20.

DETAILED DESCRIPTION OF THE INVENTION

Figure 1:
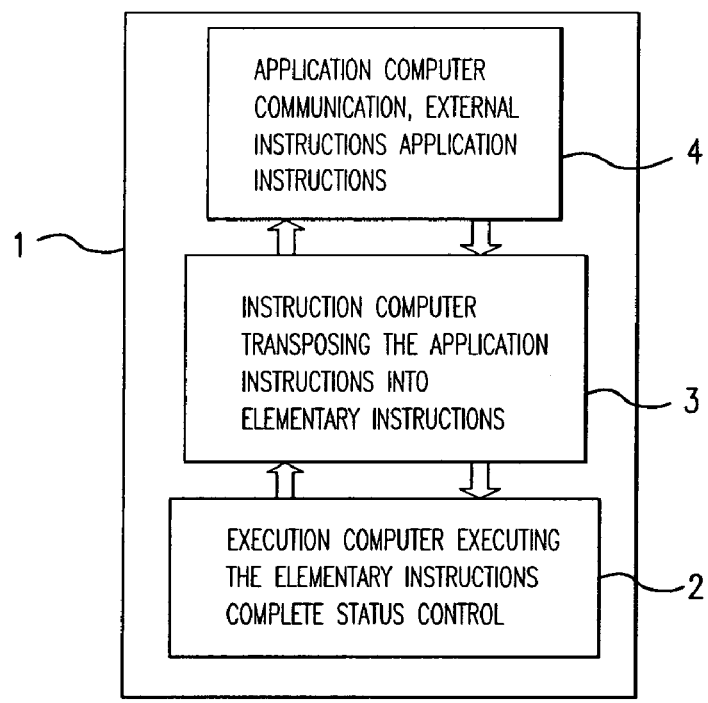
FIG. 1 representation of a basic classification of the functional ranges in the structure of the control.

FIG. 1 shows the basic classification of the functional ranges in the structure 1 of the new control. The time-critical functions of the desired signal/actual signal comparison, reactions to deviations of the actual compared to the desired state and the activation of state-changing actuators according to instructions are assigned to the execution computer 2. Instructions received from the instruction computer 3 are processed by the execution computer 2 without check. As a result, the execution of an instruction and the reaction to deviations of the actual compared to the desired state are realized autonomously by the execution computer 2. It is useful, or even compulsory to reach shortest reaction times of the control in more complex systems, to allocate to the execution computer 2 a hardware of its own with an own processor.

In the instruction computer 3 all control operations are managed on a logical-functional level. Here from device-related elementary instructions near-to-process application instructions are defined, filed and activated as single instructions, parallel or serial instruction sequences. Here on the logical instruction level also the management of the blockings for mutually exclusive States as alternatives to former locks and condition formulations over Boolean signal interconnections is carried out.

In this control concept all jobs that are not assigned to the execution or instruction computers are assigned to the application computer 4. This above all is the case of problems close to the process such as in the workpiece programme range of a CNC-control.

This control can be configured to be appropriate for problems of different size and complexity. As a result, equal principle apply of all configurations in the development system. In case of a very small number of instructions, the share of the instruction computer 3 can be assigned to the execution computer 2 as a software zone. Execution and instruction computers with own processors would be used for typical PLC problems of today with the system operated via operating and signalling elements as well as the monitor. Further, it is possible in all embodiments to couple a comfortable communication system, e.g. a transportable computer, over a simply designed interface for programming and commissioning or, in case of malfunction, diagnosis purposes.

Figure 2:
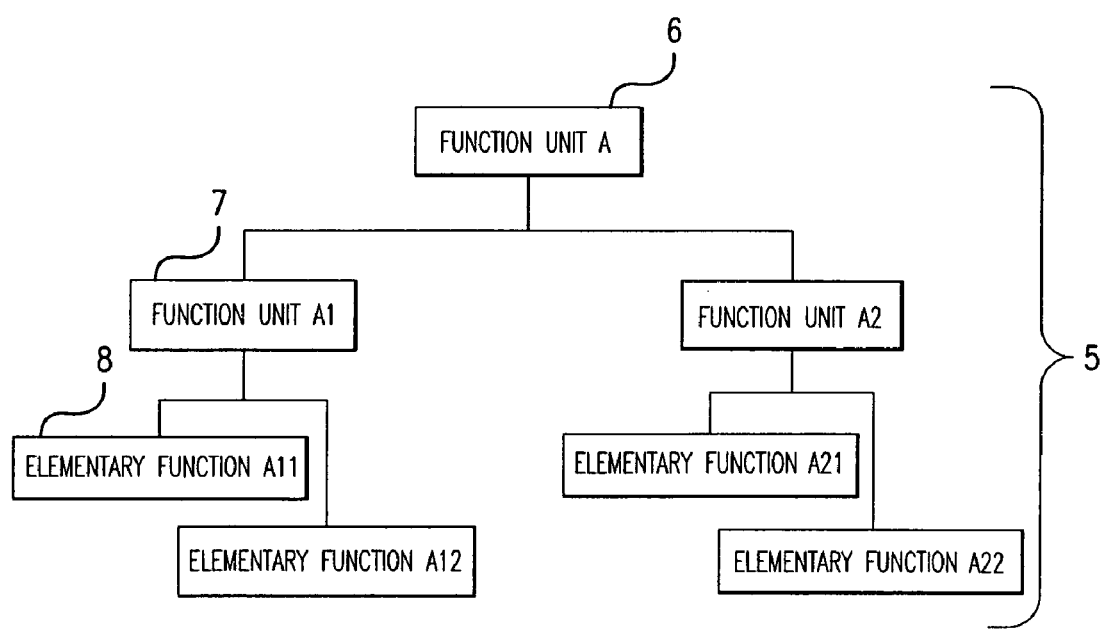
FIG. 2 hierarchically classified functional structure of a technical system.

FIG. 2 shows as an example the hierarchical functional structure 5 of a technical system. It is based on the development methodology that specific of each technical system, such a system structure can be built from the functional unit of the total system 6 over different functional units of the subsystems 7 up to the functional units elementary functions 8. In terms of the new control the final branches of this tree structure are elementary functions characterized in that these functional units can have different states and cannot be further divided usefully, the functional states of which being of interest on the control side are no longer representative of combined states of other elementary functional groups to be controlled, as it is characteristic of higher-order non-elementary functional units 6 and 7 in the structure. Here the position within the system to be controlled is decisive so that an intelligent system integrated through few elementary instructions is also classified as elementary function.

Figure 3:
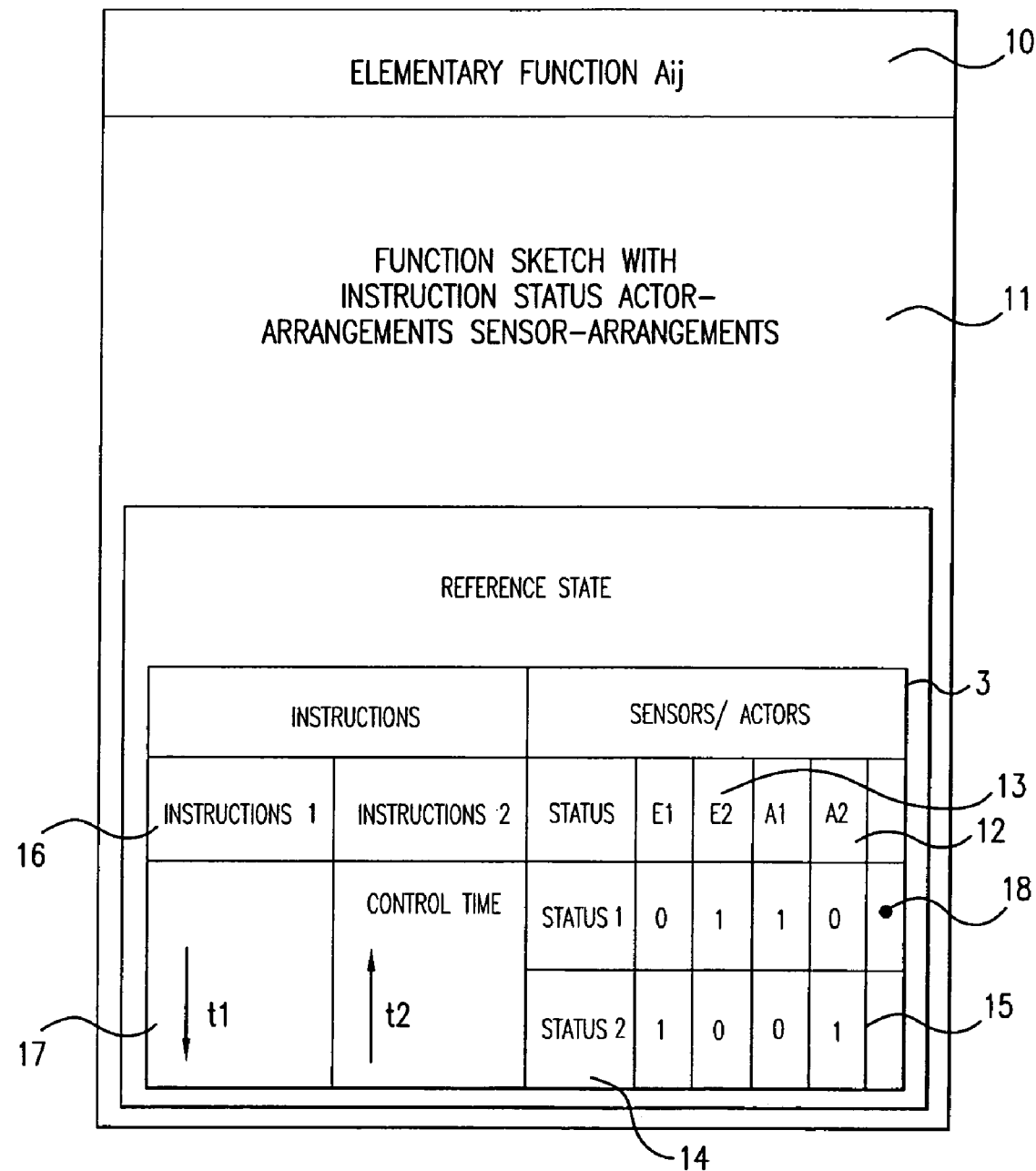
FIG. 3 information to be defined for the elementary functions on the basis of a general example.

FIG. 3 describes using a general example the information to be defined for elementary functions on a "data sheet on elementary functions" 9. In 10 the name of the elementary function is defined that identifies this elementary function.

Usefully a functional diagram 11 shows the features of the states of the elementary functions with the allocation of actuators 12 and sensors 13. In the marked areas of the state definitions 14 the information necessary for the control is systematized and defined. The state definitions 14 indicate the states that can be taken by the elementary function, and the definition of the state-assigned signal vectors 15 for the actuators 12 and sensors 13. Also here, the instructions 16 are defined that initiate the transition to a certain state. A control time 17 is predetermined for each of these transitions, which as a rule can be a multiple of the probable functional time and is only used to detect execution errors if the ordered state was not reached. By the marking, one of the possible states is defined as the reference state 18

Figure 4:
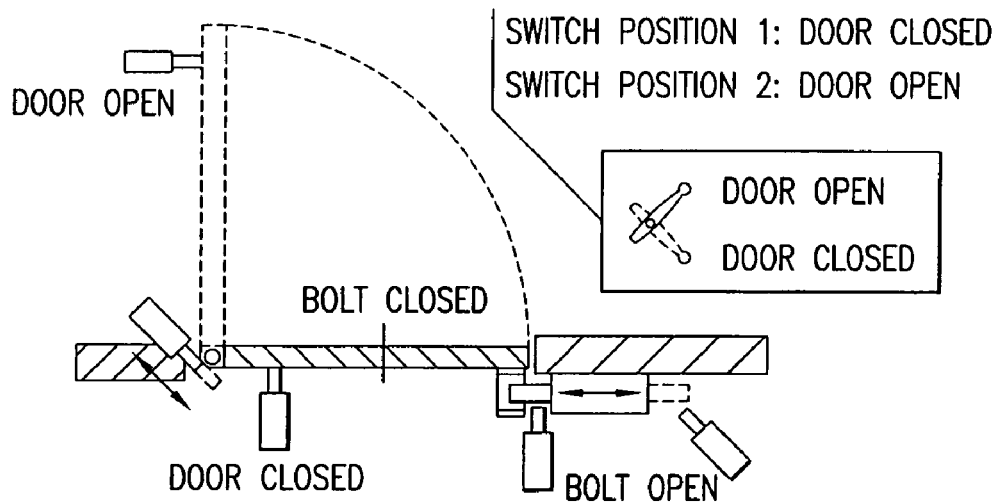
FIG. 4 simple technical system in a schematic representation.
Figure 5:
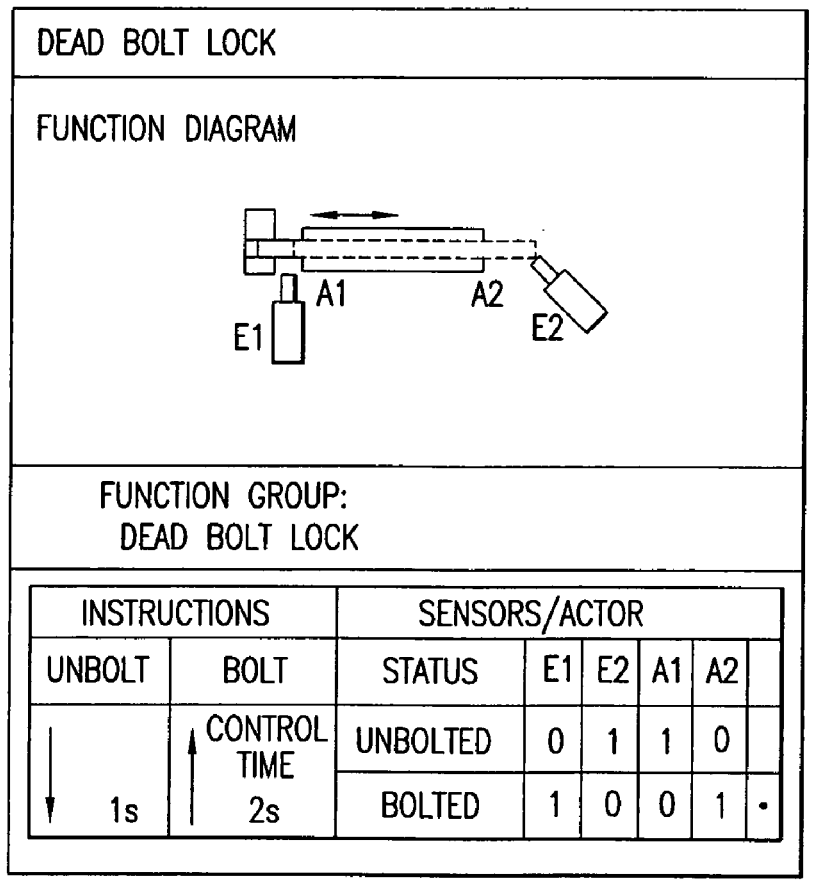
FIG. 5 functional structure according to FIG. 4.
Figure 6:
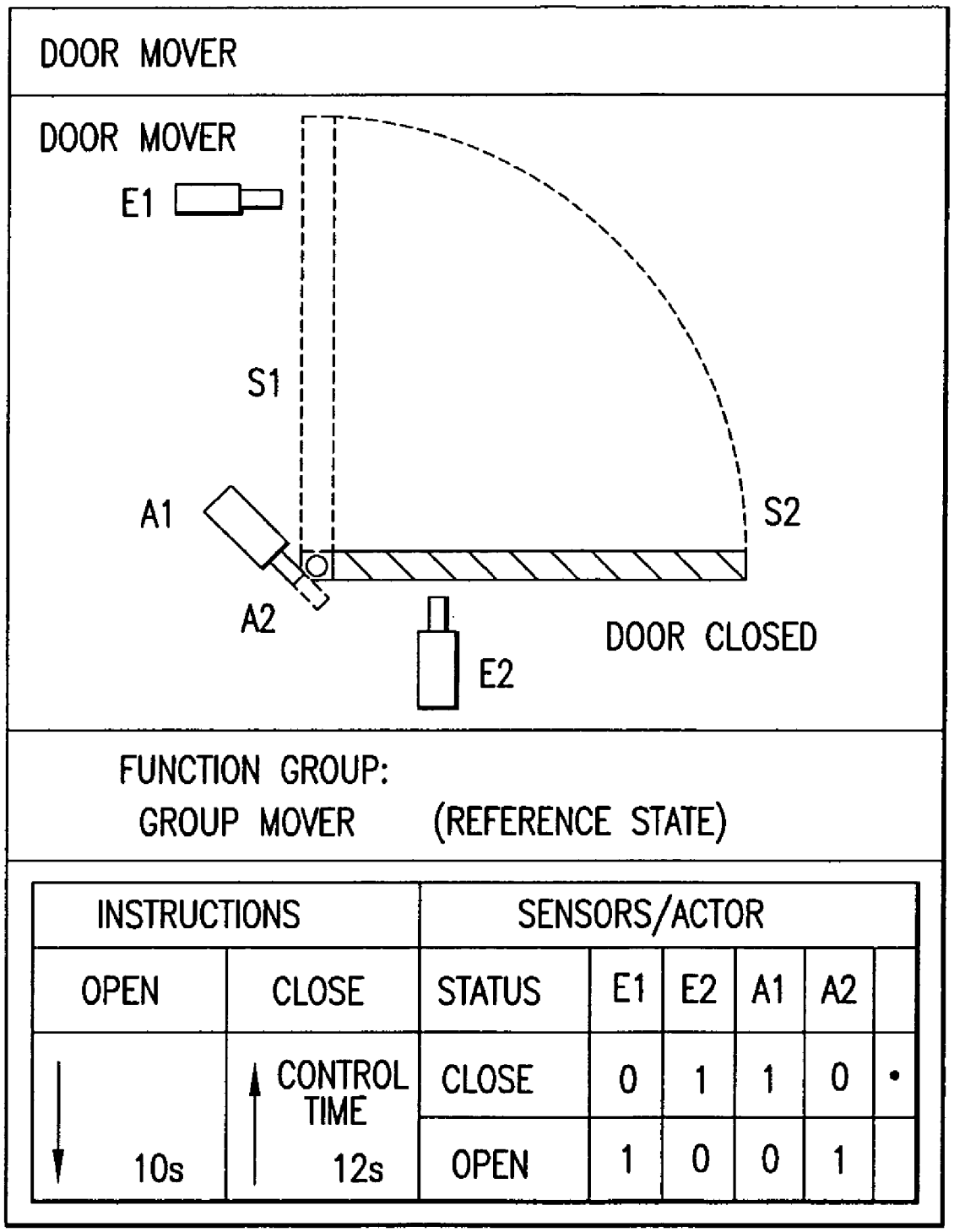
FIG. 6 definition of the elementary functions according to FIG. 4.

FIG. 4 represents a simple technical system for that in FIG. 5 the function structure and in FIG. 6 the definition of the elementary instructions is shown.

The hierarchic function structure described here and the definition of the appropriate elementary functions are, in their nature, primary development contents that can be documented already in a relatively early phase of the product development with only little additional effort.

Figure 7A:
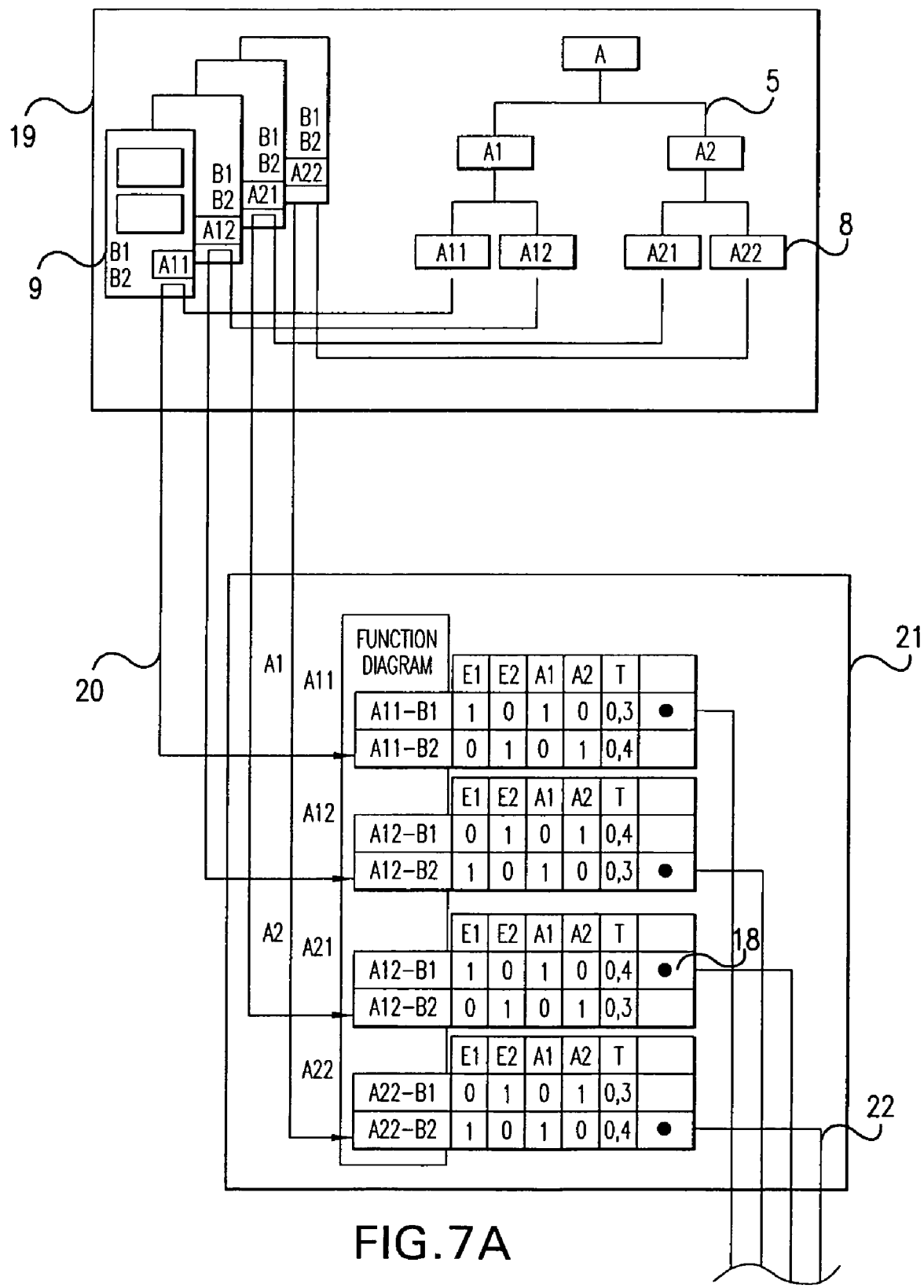
FIGS. 7A–7B representation of input and structure of a data frame to realize the control.
Figure 7B:
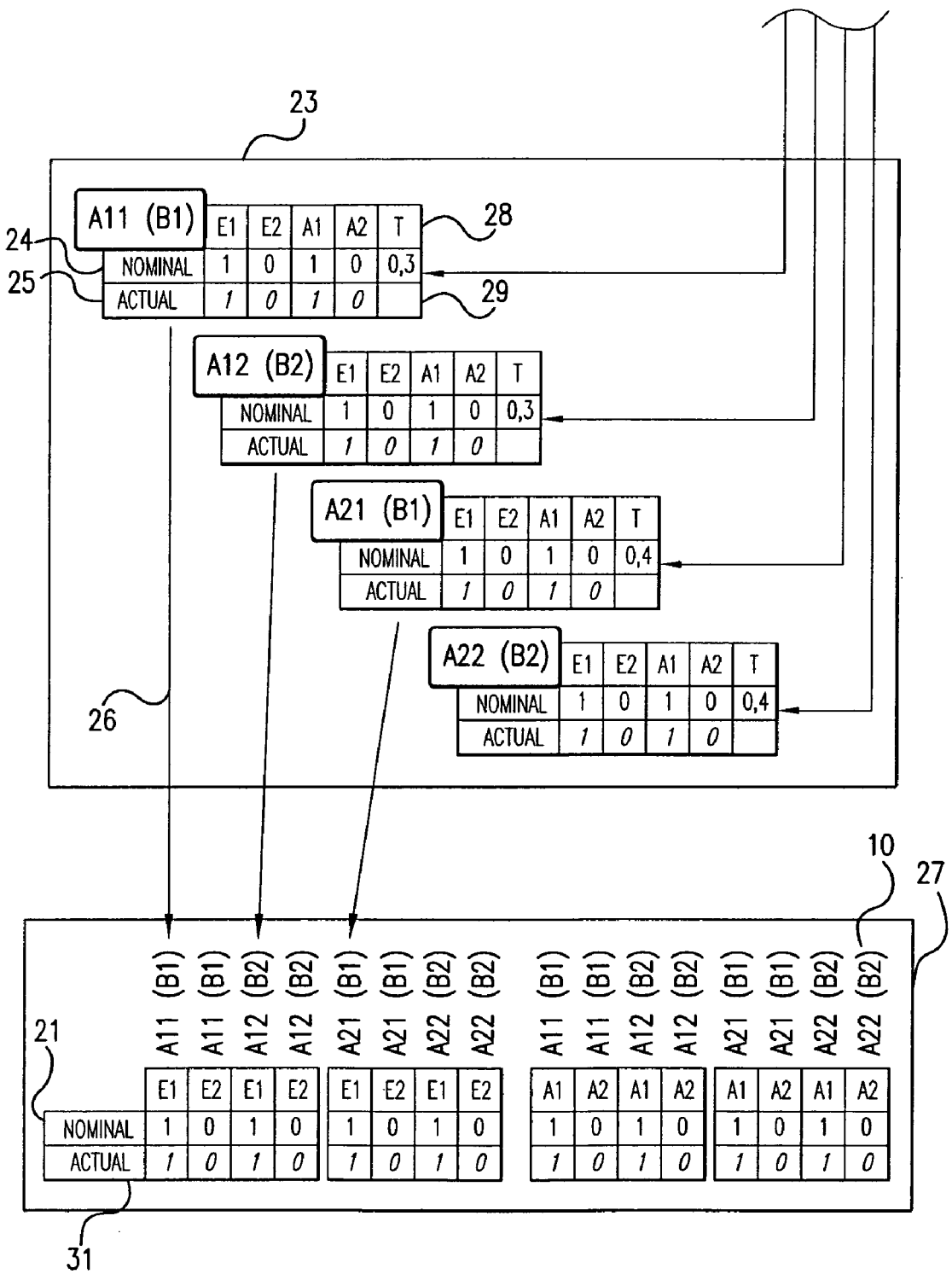

FIG. 7 shows input and structure of the data frame when the new control is used. The editing level 19 (FIG. 7A) includes both main components hierarchic function structure 5 and the data sheet of the elementary functions 9. Each functional unit elementary function 8 in the structure must be described by an appropriate data sheet on elementary functions 9. Completeness of the data and their formal correctness is automatically checked on the editing level. If there is a positive result of the check and if the user affirms the end of the system description, the input is closed and the data basis of the control for the described system is generated.

As the first step, the elementary function memory 20 is generated. This elementary function memory 21 contains all elementary instructions of the system, all system states and the information defined for them, as described in FIG. 3. The formal name of the elementary functions are derived from the structure so that elementary functions get unmistakable names even if equal data sheets are used.

On the second step, the EF-controler 22 is generated. For this, in the EF-controler 23 (FIG. 7B) the reference state of the system is generated from the defined reference states 18 of all elementary functions. For the actual state of the elementary functions also managed here, the data structure for the storage of the actual state of the elementary functions 25 is established by doubling the data structure of the desired state of the elementary functions 24. Already here, when operating the control, a comparison could be made between the desired and the actual states of the sensors of the elementary functions.

Greater effectivity is achieved by the third step referred to as 26 for the generation of the state monitor 27 (also described in greater detail further down). In this step, from the desired signal vectors of the elementary functions 28 and simultaneously from the actual signal vectors of the elementary functions 29 the desired signal vector of the system 30 and the actual signal vector of the system 31 are formed. Each sensor in the system signal vector maintains the address of its origin assigned to it as the name of the elementary function 10 in the EF-controler 23.

Figure 8:
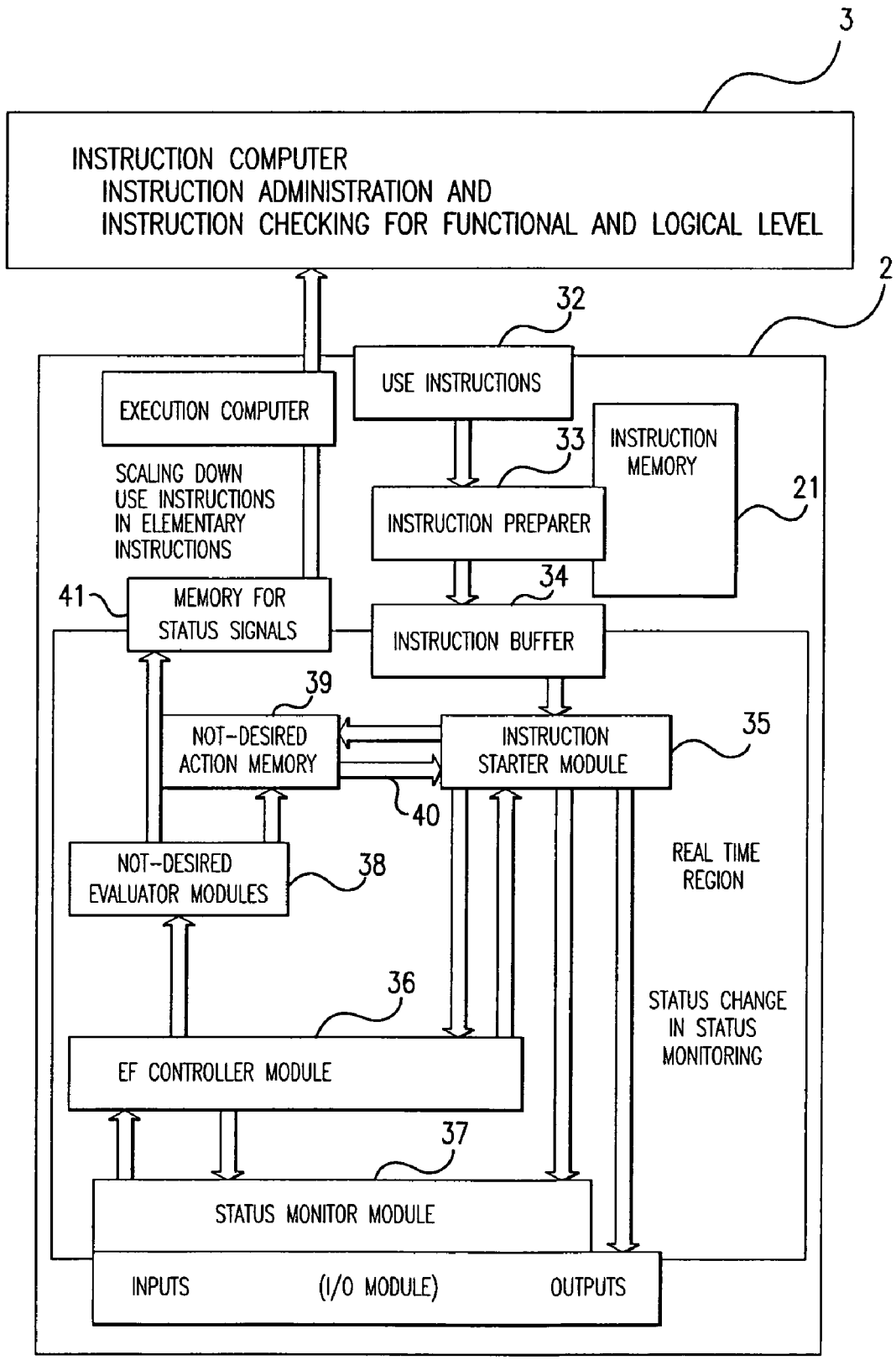
FIG. 8 structure of an execution computer.

FIG. 8 shows the structure of the execution computer 2 and its interaction with the instruction computer 3. The execution computer 2 receives an application instruction to be executed 32 from the instruction computer 3. This instruction is decoded in a module instruction editor 33. In this process application instructions are transformed into their appropriate elementary instructions and from the elementary function memory 21 the complete information content of the instruction set is given to these elementary instructions. This instruction set is entered into the instruction buffer 34 of the execution computer.

After acknowledgment of the termination of the previous instruction, the module instruction starter 35 starts processing of the instruction waiting in the instruction buffer 34 and carries out all activities involved. This concerns actualisation in the module EF-controler 36, in the module state monitor 37, and in the module not-desired state evaluator 38. The module instruction starter 35 enters the new desired state of the sensors for the concerned elementary function into the module EF-controler 36 and by setting the outputs according to the instruction, starts the appropriate actuator instruction. Also started is the control time 17 assigned to the execution of the instruction. In the not-desired state storage 39 the components of the instruction set "Not-desired instructions and messages" are entered.

After execution of the start activities by the instruction starter 35, the module state monitor 37 again takes on the comparison of the desired signal vector of the system 30 with the actual signal vector of the system 31. If this comparison detects a deviation between desired and actual signals, in the EF-controler 36 the actual state of the deviating signal in the actual signal vector of the elementary function 29 is updated.

In the EF-controler 36 the deviation is evaluated (described in greater detail in FIG. 11), either (a) without any other reaction as the state detected through the running time element "changing" and hence return of the activities to the module state monitor 37, (b) through the detection of an executed instruction for equivalence of desired signal vector of the elementary function 28 and actual signal vector of the elementary function 29 in the EF-controler 36 and hence call of the module instruction starter 35, or—if neither evaluation applies—c) transmission of the actual signal vector of the elementary function 29 to the module not-desired state evaluator 38. There this actual signal vector 29 is compared with the signal vectors existing in the not-desired state action storage 39 and on equivalence the not-desired state instruction 40 that is assigned to this case is started over the module instruction starter 35. If there is no equivalence, return to the state monitor 37 takes place. In all cases, an appropriate message 41 is created. The range marked by 42 characterizes the time-critical activities.

Figure 9:
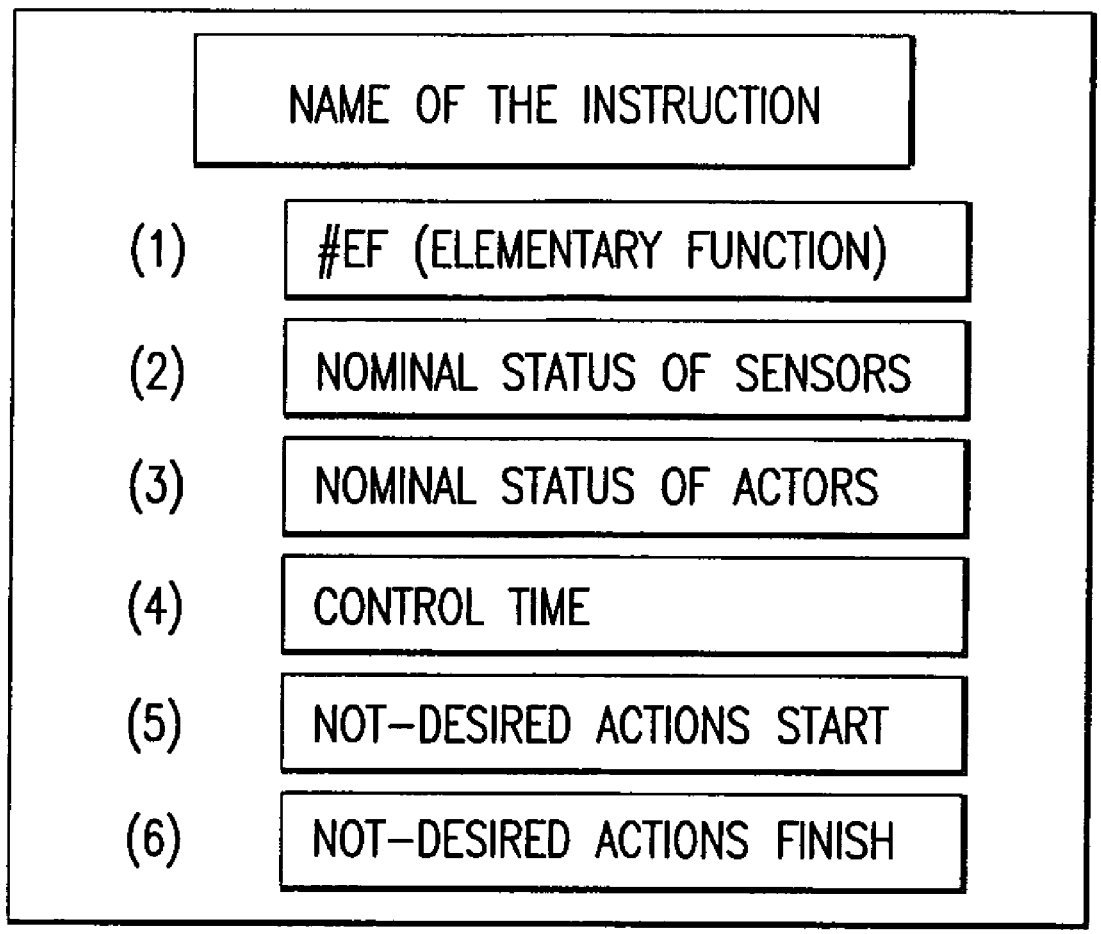
FIG. 9 content of an instruction as instruction set for the instruction buffer.

FIG. 9 shows the content of an instruction 43, as it is entered as instruction set into the instruction buffer 34 of the execution computer 2. Line (1) contains the designation of the elementary function 10 ordered for change, lines (2) and (3) contain the new desired state of the sensors, or actuators, respectively, and hence the desired signal vector of the elementary function 28, line (4) prescribes the control time 17 in which the change of the state to the new condition has to be made, line (5) contains the data for the updating of the entries which apply after the start of the instruction in the not-desired state action storage 39 for reactions with not-desired state instructions 40, and line (6) contains the same for the updating after the instruction has been processed successfully. The data on the lines (1) to (4) are in this case directly equivalent to the definitions of the editing level 19 concerning the elementary functions 8. The lines (5) and (6) can contain, in addition, not-desired state instructions 40 from definitions of process-related data on the application instructions 32.

Figure 10A:
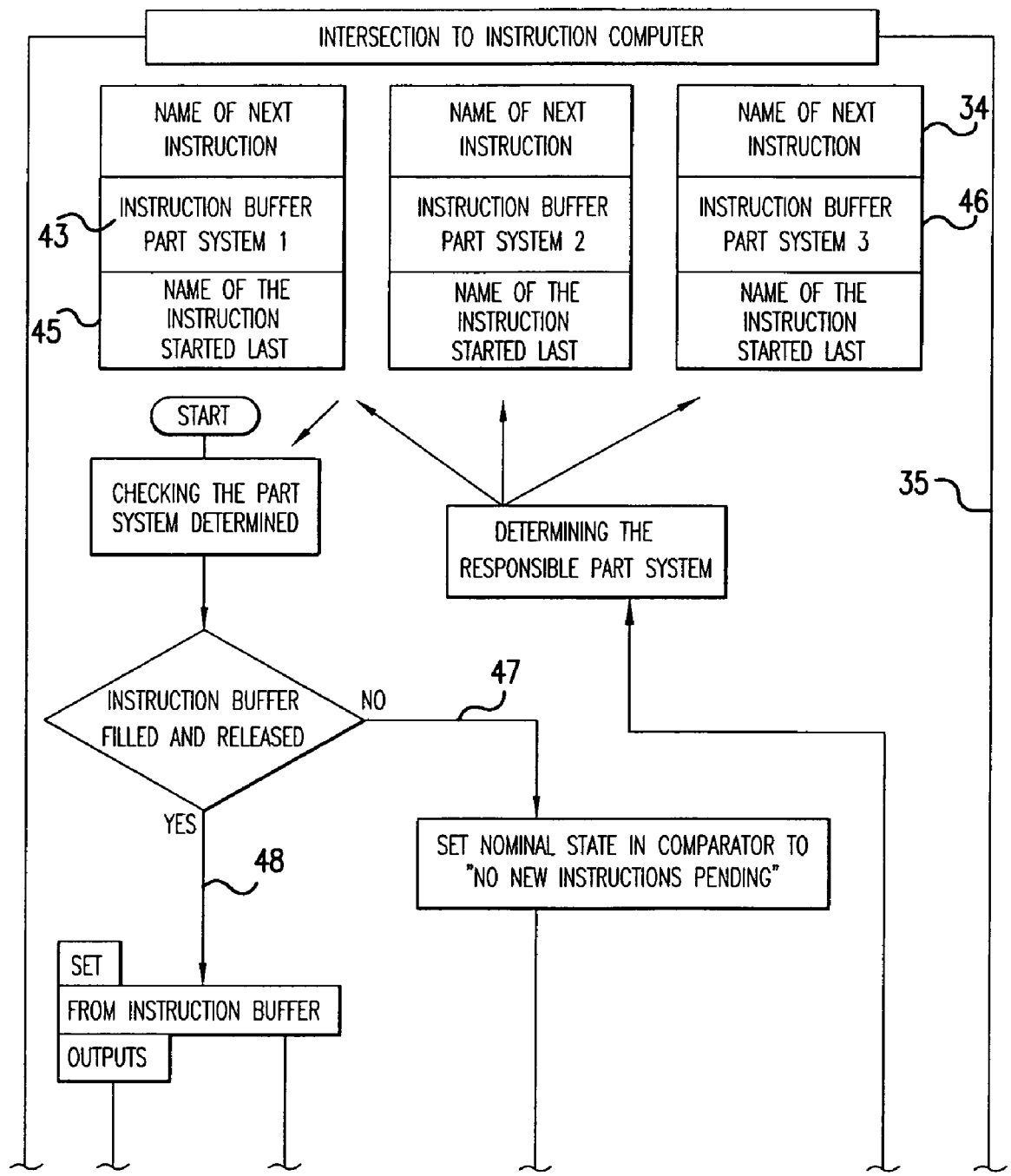
FIGS. 10A–10B representation of the function of an instruction starter.

FIG. 10 describes the function of the module instruction starter 35 and the treatment of sequential instructions 44 as well as of parallel instructions 45. The instruction buffer 34 (FIG. 10A) is always loaded by the instruction computer 3 with that instruction that follows the running instruction. Defined instruction sequences (=sequential instructions 44) are not different, in this case, from separately defined, mutually independent instructions.

Parallel instructions 45 can be executed independently from each other with regard to function and time, and for a time-optimal process, do have to be executed in parallel. For any instruction defined as parallel, therefore, an instruction buffer of its own 46 at the interface between the instruction computer 3 and execution computer 2 is defined, from which parallel, mutually independent instruction sequences 45 can be processed. If after the execution of parallel instructions 45 there are no other parallel instructions, the opened storage areas are closed again so that only actually needed buffer memories 46 exist.

Figure 10B:
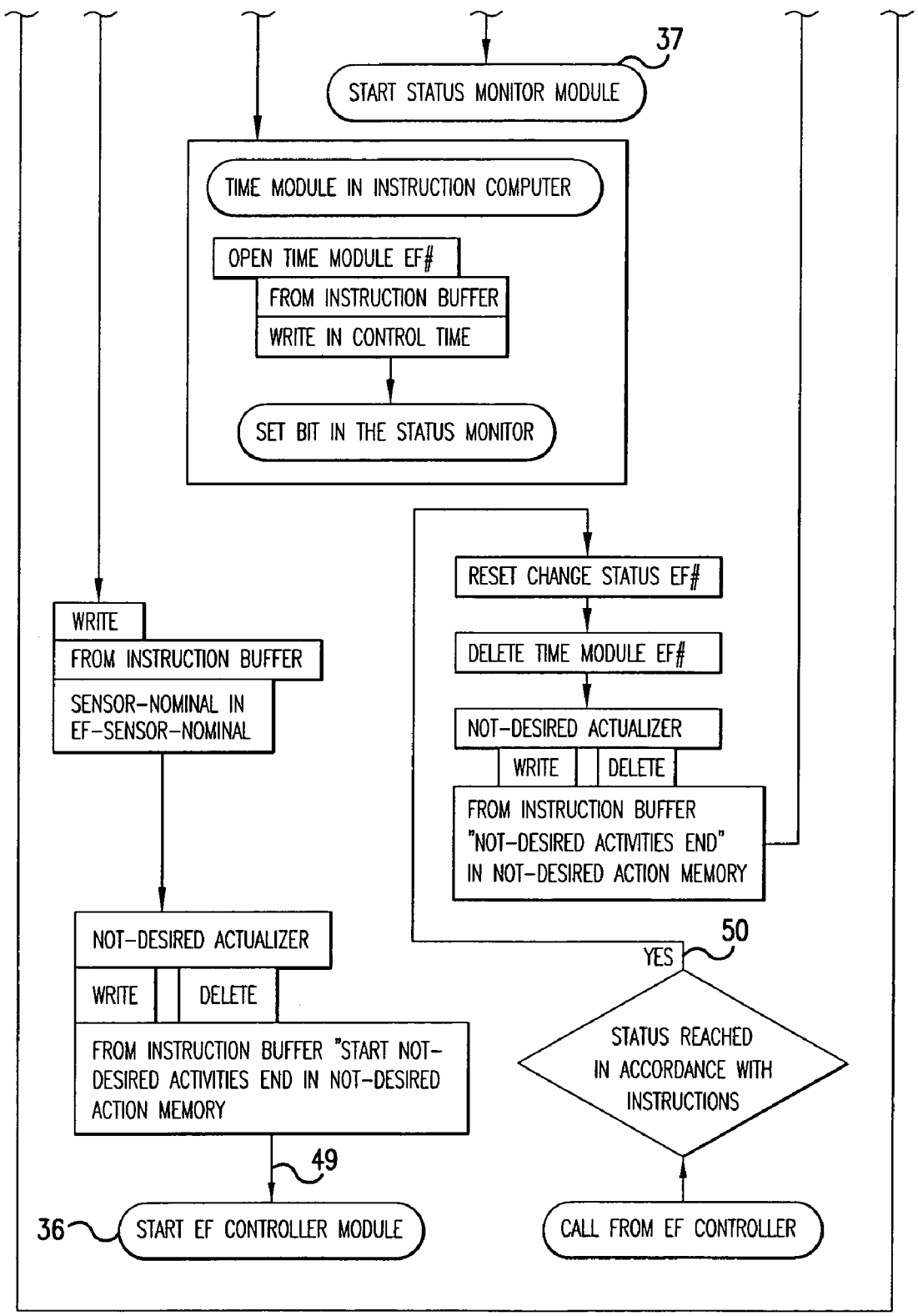

FIG. 10 shows an example of three opened parallel instructions 45, from which the entered instructions 43 are started one after the other. If the check 47 shows that there is no other instruction is waiting in the buffer storage, then the appropriate parallel instruction buffer 46 is closed and the module state monitor 37 is activated (FIG. 10B). For a positive check result 48 the instruction content 43 is appropriately updated and started. After the end of these operations the module EF-controler 36 is activated 49. After reaching the ordered state 50 the updatings defined therefore in the instruction set 43 are carried out by the instruction starter 35 and then the next instruction determined and started.

Figure 11:
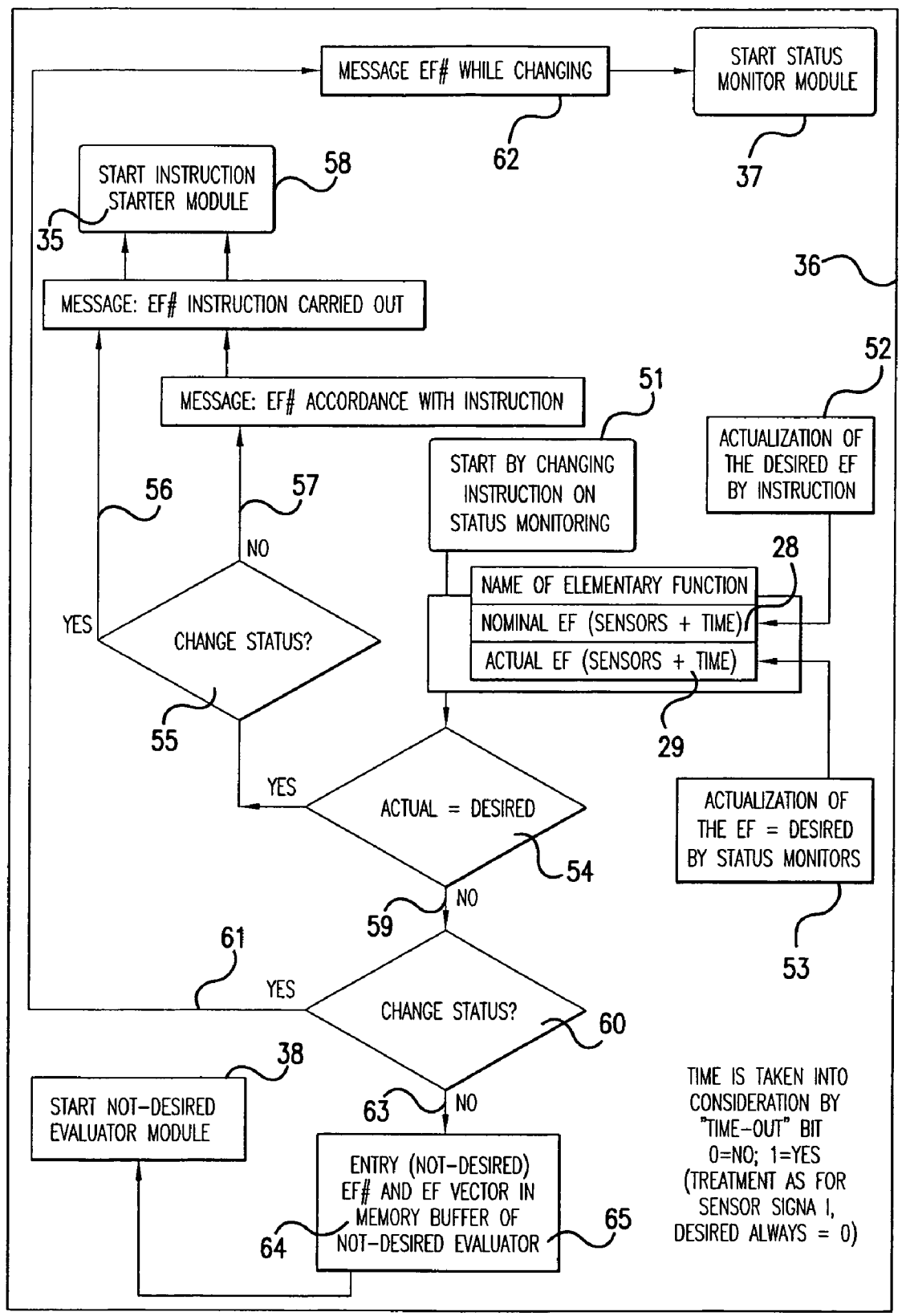
FIG. 11 representation of the function of an EF-controler.

FIG. 11 indicates the function of the module EF-controler 36. The start 51 of an activity of the EF-controler is always activated by an actual change. This is either a new desired signal vector of an elementary function 28, which is entered by the module instruction starter 35 in a new instruction, or an updating 53 of the current actual state made by the module state monitor.

The first check 54 compares the desired state to the actual state. In case of equivalence it is checked whether the change status 55 was set. If this is true 56, a running instruction ended, otherwise 57 the ordered state was regained after a faulty deviation. In either case an appropriate message is created and the module instruction starter 35 is started 58.

If the desired and actual states do not agree, branch 59 is processed. Again the change status is checked 60. If the change status for this elementary function is before 61, the message "EF changing" 62 is created and the module state monitor 37 started. If there is no change status 63, the name and the current not-desired state actual signal vector 64 of the elementary function are entered into the evaluation memory of the not-desired state evaluator 65 and the not-desired state evaluator 38 is started.

Figure 12:
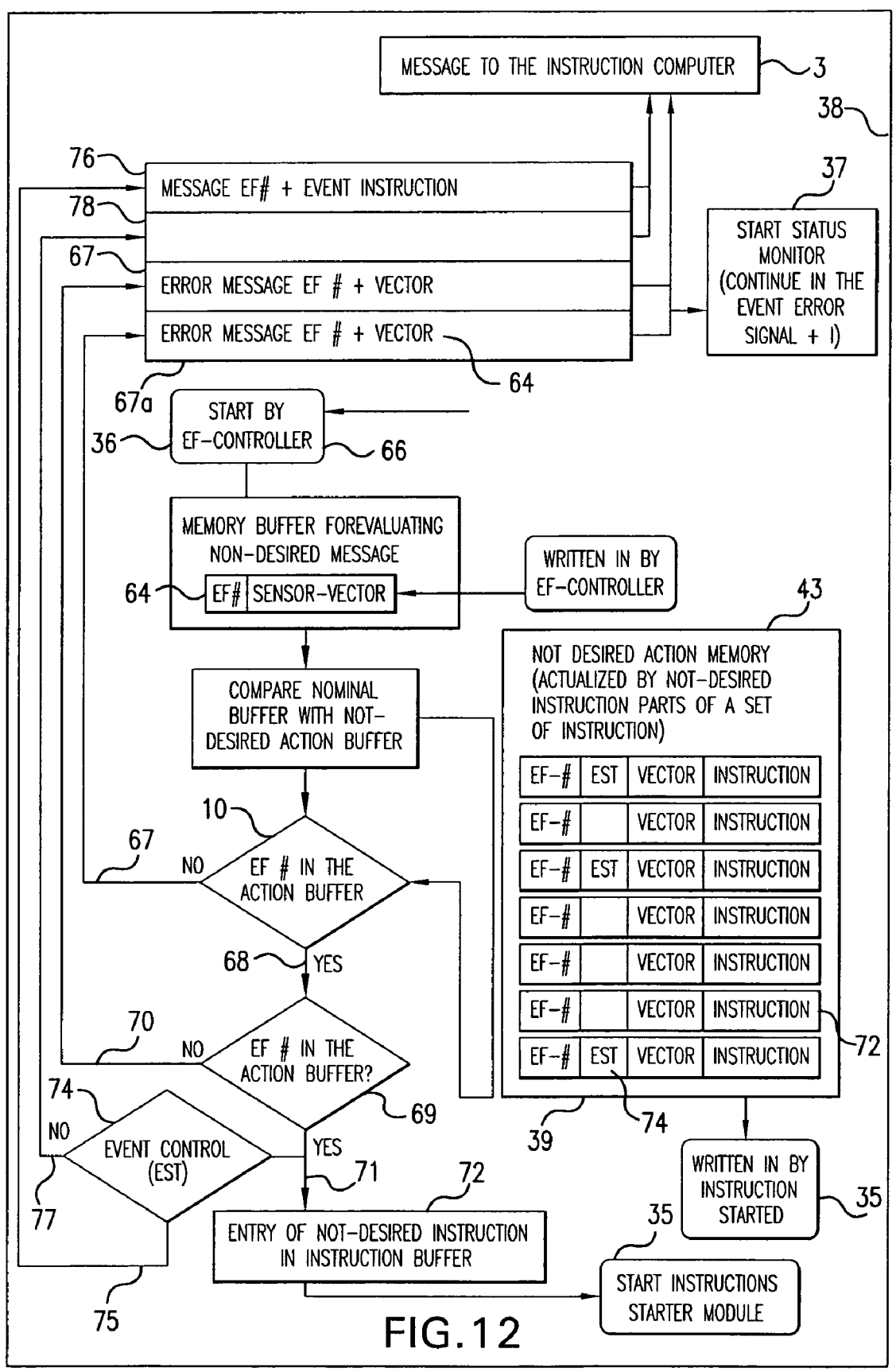
FIG. 12 representation of the function of a not-desired state evaluator.

FIG. 12 shows the function of the not-desired state evaluator 38. The start 66 of the not-desired state evaluator is activated by the EF-controler 36 after transmission of a not-desired state signal vector 64. In the first step it is checked, whether there are entries under the name of the elementary function 10 in the not-desired state action storage 39. (As it has already been mentioned in FIG. 10, these entries are updated by the instruction starter 35 as information components of an instruction 43.) If there are no definitions for the elementary function in the not-desired state action storage 39, 67, only an error message 67a bearing the designation of the elementary function and the not-desired state actual signal vector 64 with the faulty signal marked is transmitted to the higher-order control level—the instruction computer 3—for evaluation. Then the module state monitor 37 is re-started.

If in the not-desired state action storage 39, there is a not-desired state signal vector for the elementary function 68, the not-desired state actual signal vector 64 is, as the next step, compared for equivalence with the stored signal vector 69. If there is no equivalence 70, again only a concrete error message 67 is created and the state monitor 37 started.—If, however, there is an equivalence of the signal vector with entries in the action storage 71, the reaction instructions 72 defined for this case are transmitted to the instruction starter 35 to be immediately executed.

In parallel to the comparison, it is checked for the message to be created 73, whether there is an event control 74. In case of an event control 74, the system moves in the normal functional frame, an event which has been detected activates an appropriate action (e.g., switch-off of a pump when the upper level has been reached). In this case, the appropriate message 75 clearly distinguishes the event instruction of the elementary function 76 from error states. If it is not an event control 77, an appropriate error message 78 is created.

Figure 13:
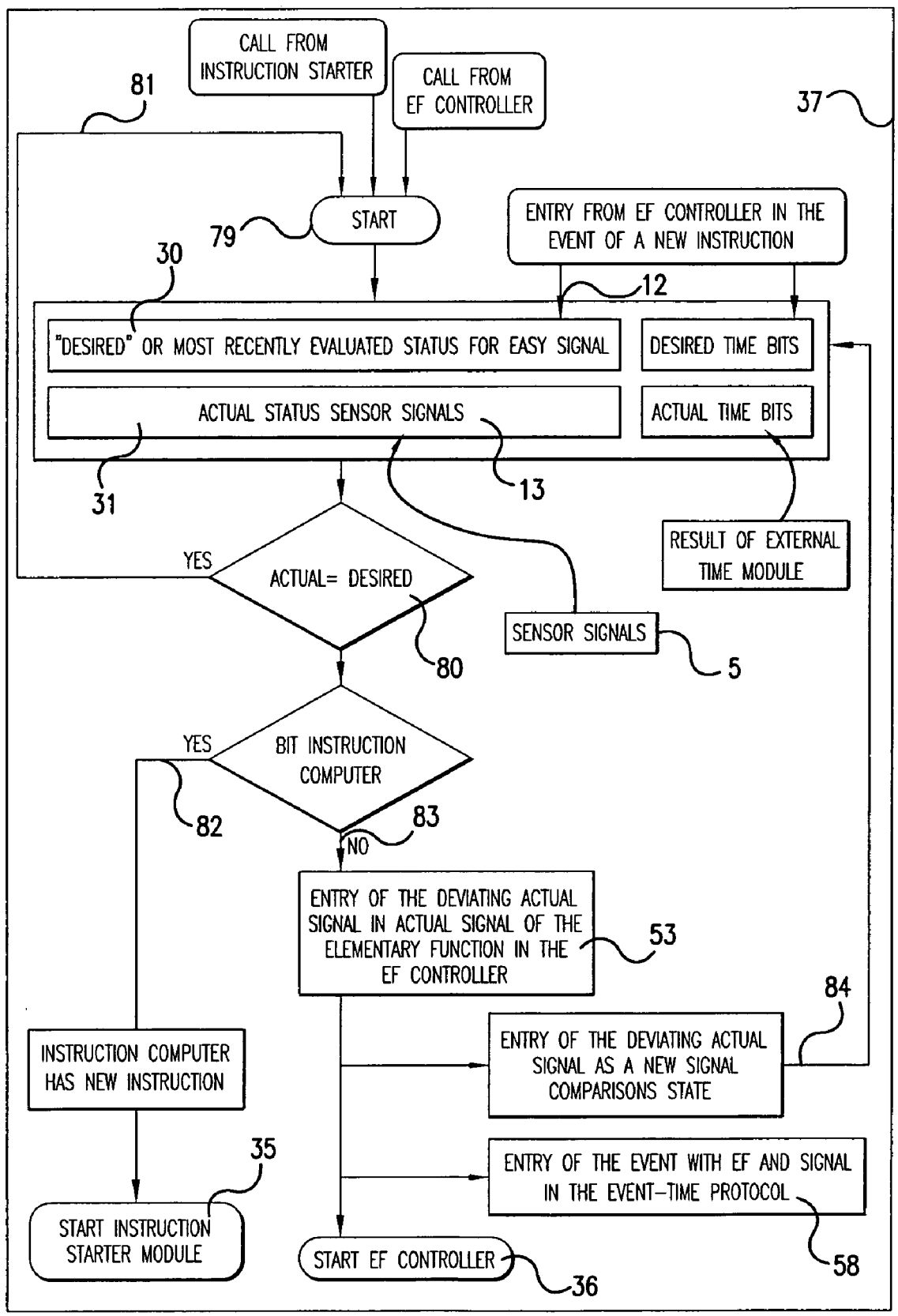
FIG. 13 representation of the function of a state monitor.

FIG. 13 shows the function and features of the module state monitor 37. If no other activities of the module run, the state monitor starts continuously the comparison 80 of the desired signal vector 30 and the actual signal vector 31 of the system. This comparison always includes the whole system signal vector and is continuously repated 81 when there is equivalence of the compared states.

When a deviation is detected, first, it is checked whether the system left the waiting state und is to execute a new instruction. If this is true 82, then the module instruction starter 35 is started. If it is not true, the deviating actual signal is entered into the actual signal vector of this elementary function in the EF-controler 83 and is-as it has been explained for FIG. 11—evaluated there. A deviation can develop either by the presetting of a new desired state on the start of a new instruction and entry into the desired signal vector 30 of the system by the EF-controler 36, or in the other case, by a changed sensor signal in the actual signal vector 31 of the system.

After entry of the deviating actual signal into the concerned elementary function in the EF-controler, this signalled actual state is entered as the new comparison state into the desired state comparison vector 84. This ensures that each change is evaluated only once. Therefore, the desired comparison state of the system signal vector is defined as the comparison with "the last evaluated state" of the system 84. This makes it possible and useful to enter the detected event into an event-time protocol 85 that is described in detail in FIG. 14.

After the mentioned actions of the state monitor 37, this state monitor starts the module EF-controler 36. After evaluation, again-as within the functioning of the EF-controler, or instruction starter, respectively-the module state monitor is activated. It continues the desired/actual state comparison in the system signal vector at that signal that follows the last not equivalent signal.

This ensures that all signals of the system signal vector are compared one after the other and a vibrating signal cannot cause an infinite loop to run. Such a phenomenon could be imagined at another start of the comparison at the signal just evaluated, if this signal would change its state with the pulse of the signal transfer time.

FIG. 14 is intended to illustrate the design of an event-time protocol 85 in form of a list. The first column includes the name of the elementary function concerned by the event, column 2 the signal concerned by the change, column 3 the changed signal state. These data are copies of the information that the state monitor transmits to the EF-controler. If the actual system time is entered in column 4, a process protocol is produced that can be used in many cases. In this example, it is marked by the first and last entries that the elementary function A11 with the signal E1 has again reached the first state. The times assigned to the events could be used if demanded as a precise measure of such a period. This protocol makes it also possible to detect signal vibrations and activate filter if needed, that can reduce, for example, the scanning frequency for the vibrating signal. Dependent on the process and importance of the information as well as the available storage, longer periods of time can be recorded and stored, which can be used for the diagnosis of long-time changes, or based on a fixed storage volume only the last, in each case, period can be available for, e.g., the evaluation of a breakdown.

Figure 15:
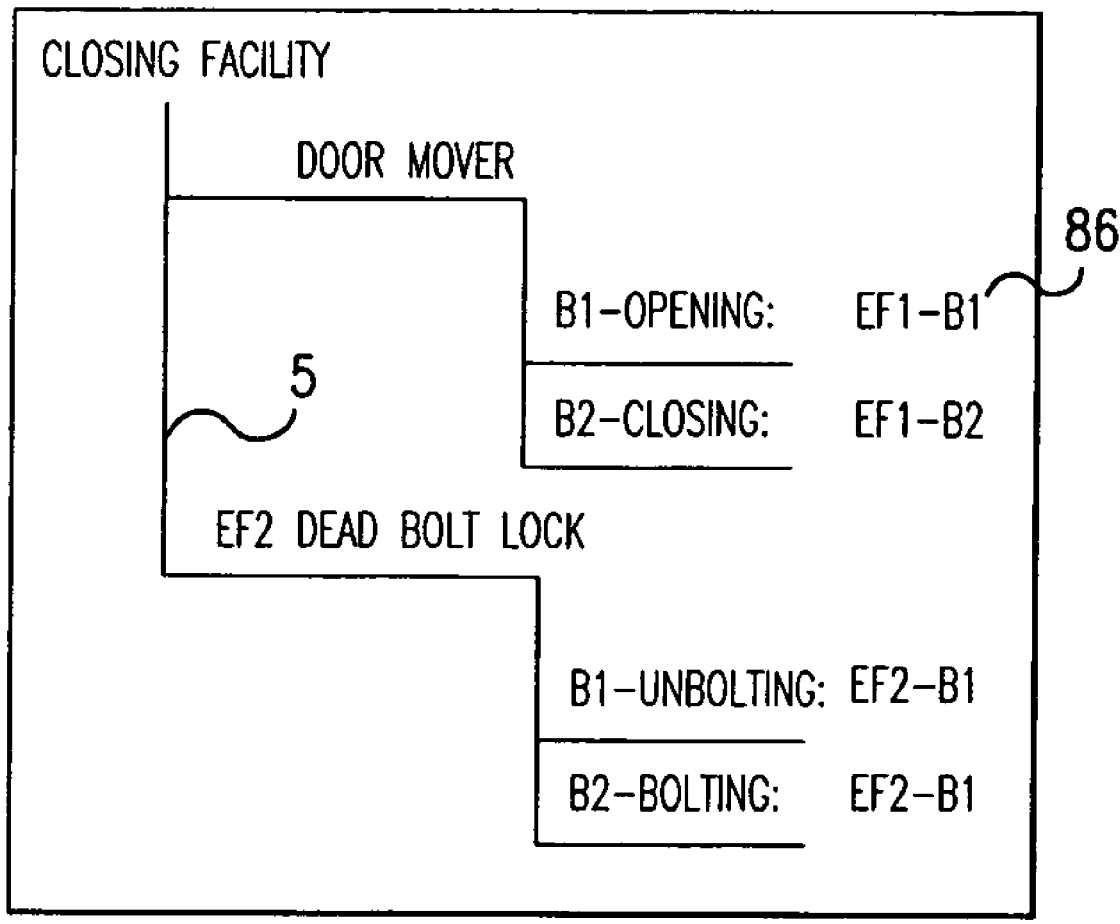
FIG. 15 an example of a formation basis for formal instruction names.

FIG. 15 shows for the example of FIGS. 4 to 6, the basis of formation of the formal instruction names 86, which are derived from the function structure 5 and can be used for an unambiguous designation of the elementary functions in application instructions.

In FIG. 16, the definition of application instructions and the determination of instruction blockings 88 for the application instructions is shown for the example of FIGS. 4 to 6.

Figure 17:
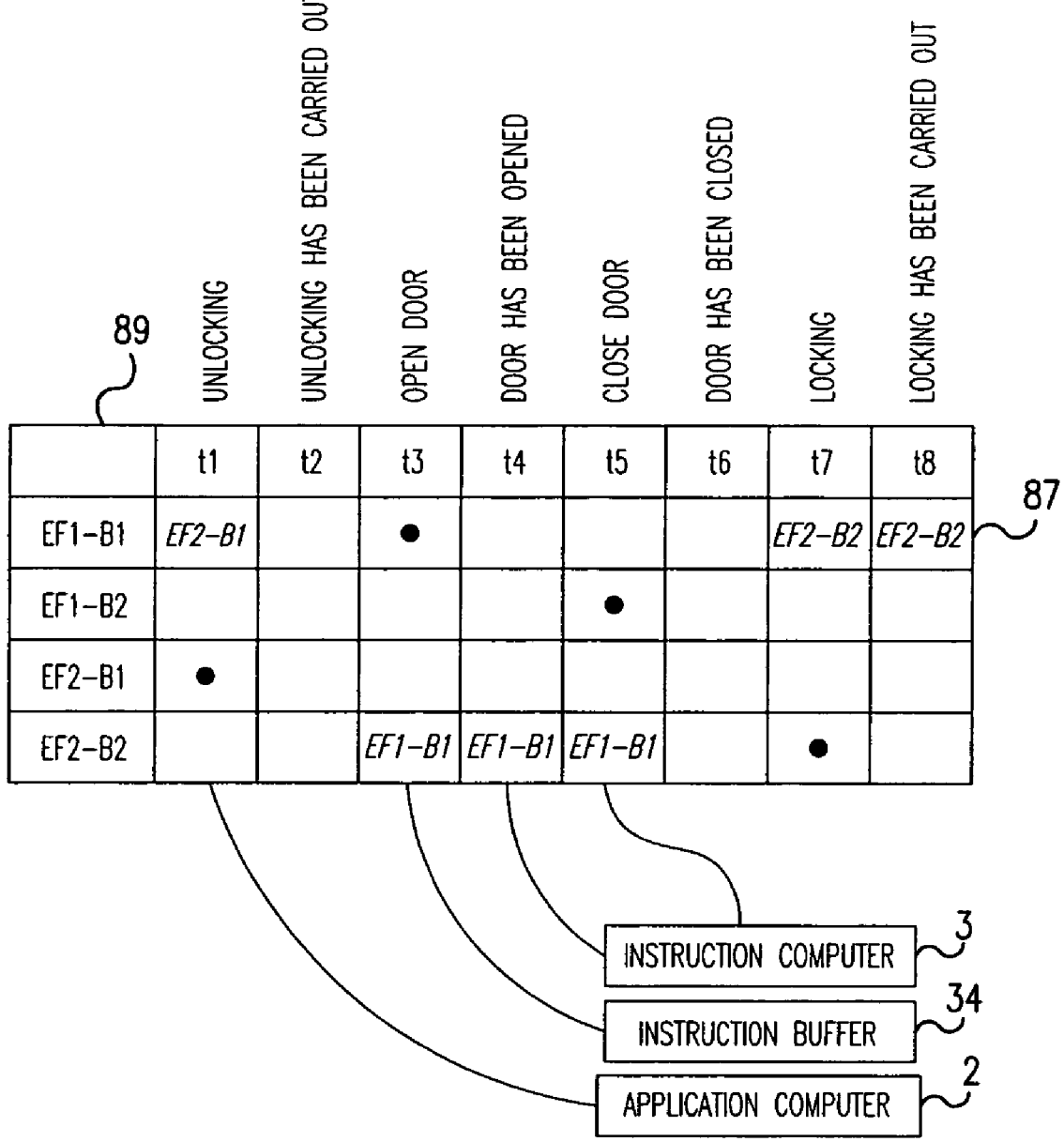
FIG. 17 an example of a blocking list managed in a control.

FIG. 17 shows, as an example, the blocking list 89 of the system Locking device managed in the control, and is intended to illustrate the dynamic action of the blocking conditions determined in FIG. 16. As to FIG. 17, it has to be emphasized that it is an auxiliary representation and there is no such table in the control. Only a storage area exists, in which at different points of time (shown here by t1 to t8) different conditions are entered by the instructions that have been effective up to these points of time.

In column 1 all instructions of the system are listed. If an activated application instruction contains a blocking condition for another instruction, the causing instruction is entered as blocking condition in the other instruction. In this example, with its activation at time t7, the instruction EF2-B2 (locking) blocks the instruction EF1-B1 (Open door mover). As it has been determined, the locking bar should only be put in, if the door is closed-therefore the entry of the blocking at EF2-B2 with ordering the instruction "(Open the door) EF1-B1" at time t3.

It is essential for the function of the control that after the transmission of an application instruction 32 to the instruction computer 34 of the execution computer 2—which instruction the execution computer can execute autonomously as mentioned—the instruction computer 3 updates its state as it will be after correct execution of this instruction. For this state the permissibility of the next instruction is checked even during the execution of the previous instruction and this instruction released, if appropriate. In the example, during the execution "Unlocking the bar" at t1 the instruction "Open the door" is in the instruction buffer, which will be started at the time point t3 and will then simultaneously activate the check of the instruction "Close the door" for the time point t5 under the conditions of the time point t4.

This allows in a time-optimal way that with the termination of an instruction the subsequent already checked instruction can start or, respectively, it is detected even during the execution of an instruction that the prepared next instruction is not permissible for the system state coming. If there is an error in the instruction running in the execution computer, the instruction computer is reset updated to the error state.

FIG. 18 presents an example for the determination of error instructions. Assume as critical that on closing—for any reason—the door meets an inserted bar. FIG. 18 shows the formulation of an instruction error as component of the instruction set "Close door mover". From the state of the elementary function Bar lock E1=1, "Bar not free" is concluded and as the error reaction in the not-desired state evaluator, the process "Close door" is transformed into "Open the door".

Analyses show that as a rule, only few error instructions are required at a certain time point. On principle it is possible to react to any event by each instruction.

Figure 19:
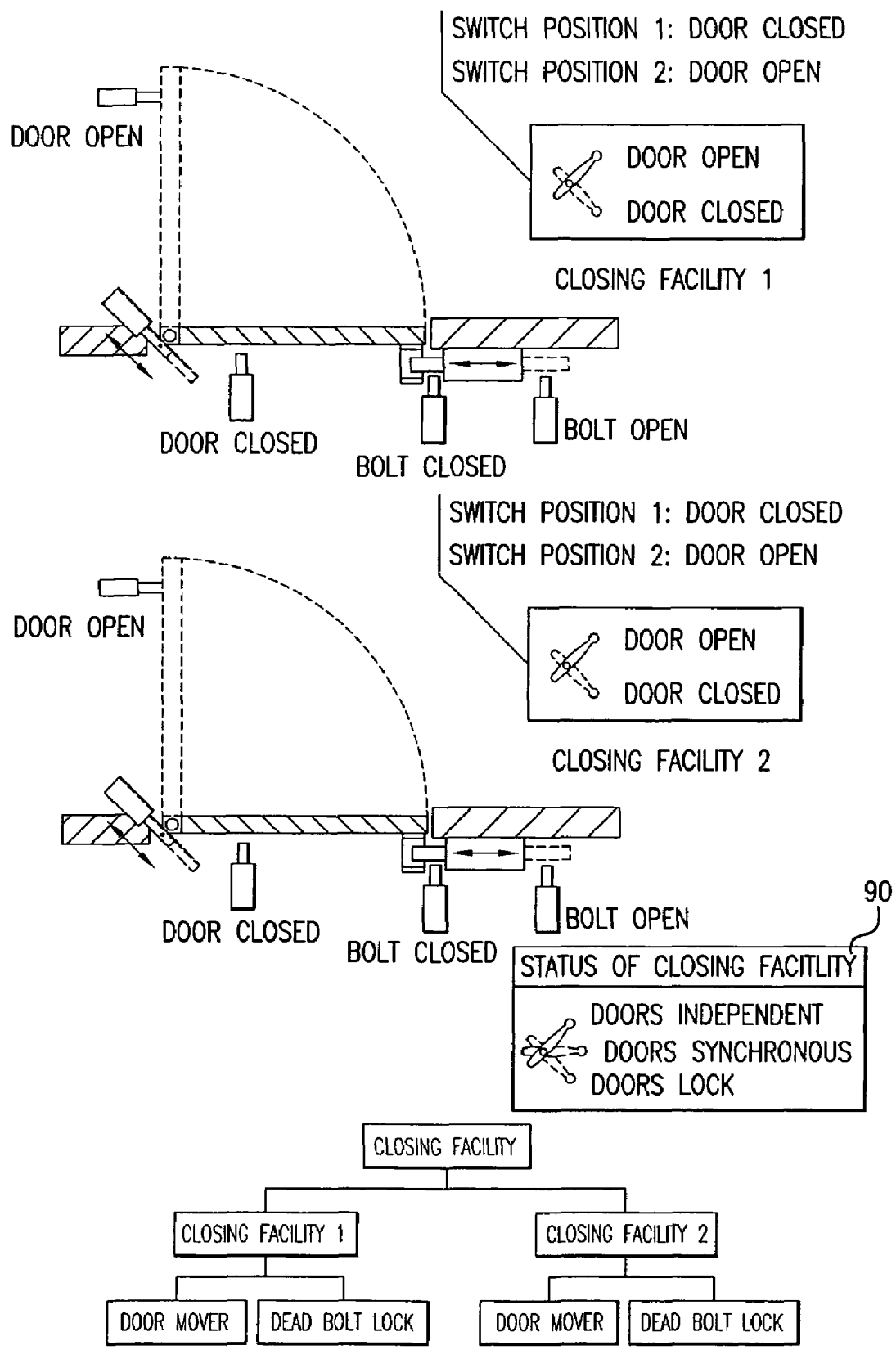
FIG. 19 an example of a control with more complex functions.

FIG. 19 is another example for the potential of the control for the solution of more complex problems and different application requirements of a plant. For those different application requirements and the instruction and blocking conditions resulting therefrom the term "status" 90 will be used.

It is assumed that two door devices be controlled either of which are equal to the example discussed so far. A device switch for each demanded operational status is added: in state S1 the doors can be independently of each other, in S2 both doors are synchronously opened or closed, respectively, and in S3, operated as a lock chamber, always one of the doors maintains closed.

Figure 20:
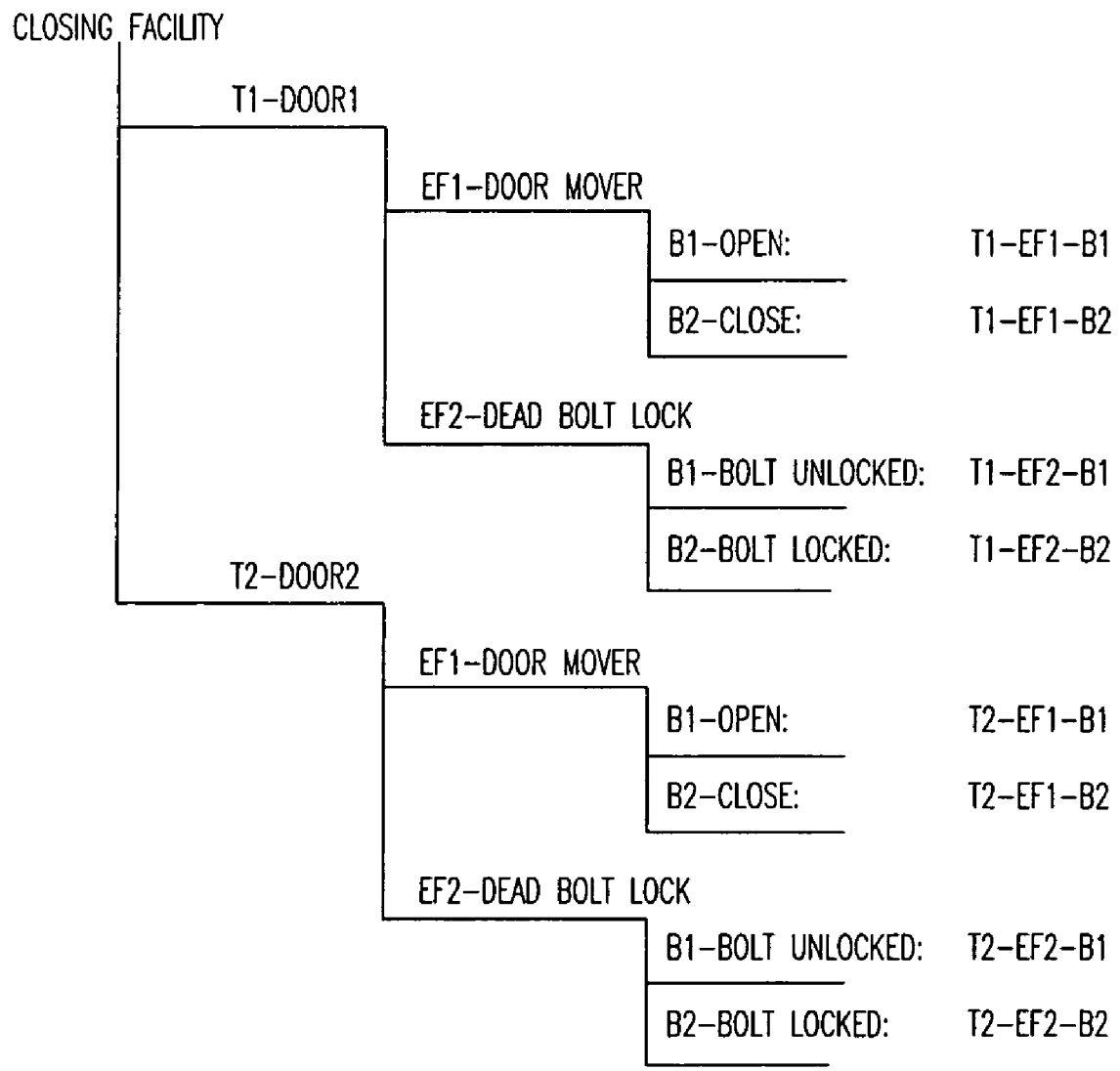
FIG. 20 structure and name definition according to FIG. 19.

FIG. 20 shows the structure and the name definitions as they are designed by the control using the data given on the editing level 19.

FIG. 21 indicates all data for the instruction library 92 of the instruction computer necessary to solve the problem. The determinations established for the closing device of one door are doubled for the direct door control of a copy on the generation under the new system name. All determinations on the control status of both doors are realised over new stats instruction sheets 91 that are selected over the status switch. For the status S3 instruction sheet, no elementary function was used but, by "Door x", a higher-order hierarchical level in the function structure. Thus, very effectively, whole function areas can be blocked against state changes or selected by formulations such as "All except XXX".

Figure 22:
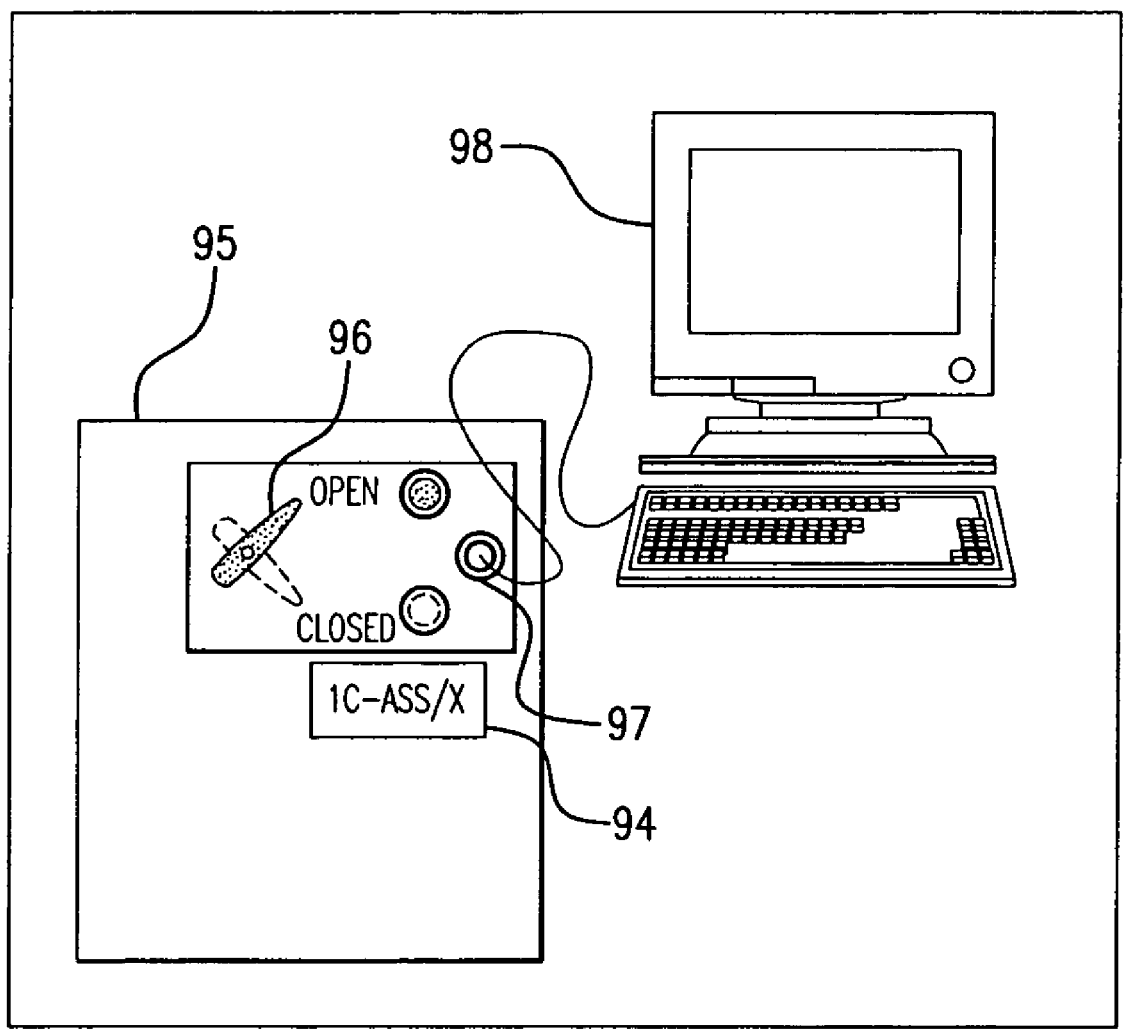
FIG. 22 features of an embodiment as small-scale control.

FIG. 22 shows features of a small-scale control 94 in a technical device 95. The relatively small and fixed instruction volume of the small-scale control 95 is arranged in a control hardware module that includes the functionalities of the execution computer 2 and the instruction computer 3. Operation is by the usual switch and indication devices 96. Over an interface 97, the computer 98 can be coupled so that all the functionality of the control for entering the control software and comfortable communication and diagnosis are possible.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

NOMENCLATURE

1. Structure of the control
2. Execution computer
3. Instruction computer
4. Application computer
5. Function structure
6. Functional unit Total system
7. Functional unit Subsystem
8. Functional unit Elementary function
9. Data sheet for elementary functions
10. Name of the elementary function
11. Function diagram
12. Actuators
13. Sensors
14. State definitions
15. Signal vectors
16. Elementary instructions
17. Control time
18. Reference state
19. Editing level
20. Generation of the elementary function memory
21. Elementary function memory
22. Generation of the EF-controler
23. EF-controler
24. Desired state of the elementary functions
25. Actual state of the elementary functions
26. Generation of the state monitor
27. State monitor
28. Desired signal vector of the elementary function
29. Actual signal vector of the elementary function
30. Desired signal vector of the system
31. Actual signal vector of the system
32. Application instruction
33. Instruction editor
34. Instruction buffer
35. Module instruction starter
36. Module EF-controler
37. Module state monitor
38. Module not-desired state evaluator
39. Not-desired state action memory
40. Not-desired state instruction
41. State message
42. Time-critical functional region
43. Content of an instruction
44. Sequential instructions
45. Parallel instructions
46. Instruction buffer for parallel instructions
47. Check result instruction buffer "No"
48. Check result instruction buffer "Yes"
49. Activation of the EF-controler
50. Activities instruction starter when "ordered state" is reached
51. Activity start EF-controler
52. Change of the desired state in the EF-controler due to instruction
53. Change of the actual state in the EF-controler due to sensor message
54. Comparison of desired and actual states in the EF-controler
55. Change status in the EF-controler
56. Alternative "Change status"
57. Alternative "No change status"
58. Activation of the instruction starter by the EF-controler
59. Alternatives for non-equivalence of the desired and actual states in the EF-controler
60. Check for change status non-equivalence of the desired and acutal states in the EF-controler
61. Activity for change status and non-equivalence of the desired and acutal states in the EF-controler
62. Message from the EF-controler "Elementary function (name of elementary function) changing"
63. Alternative in the EF-controler for actual state not equal to desired state and no change status
64. Not-desired state actual signal vector
65. Evaluation storage not-desired state evaluator
66. Start of not-desired state evaluator
67. Action when not-desired state elementary function has no entry in the not-desired state action storage
67a. Error message on not-desired state elementary functions
68. Action when not-desired state elementary function has an entry in the not-desired state action storage
69. Comparison of the not-desired state signal vector with the not-desired state signal vector stored in the not-desired state evaluator
70. Action for non-equivalence not-desired state actual signal vector with not-desired state signal vector in the not-desired state evaluator
71. Action for equivalence not-desired state actual signal vector with not-desired state signal vector in the not-desired state evaluator
72. Reaction instructions in the not-desired state action memory
73. Check whether not-desired state actual signal vector belongs to an event control
74. Event control
75. Message event control
76. Content of the message event control
77. Error message if no event control
78. Content of the error message
79. Start of the module state monitor
80. Comparison of the desired signal vector of the system with the actual signal vector of the system
81. Programme loop for the comparison of the desired signal vector of the system with the actual signal vector of the system
82. Transmission of the activity from state monitor to instruction starter
83. Entry of changes actual sensor signal from state monitor in the EF-controler
84. Comparison desired vector "last evaluated state" in the state monitor
85. Event-time protocol
86. Formal instruction names
87. Instruction blockings
88. Blocking list in the instruction computer
89. Blocking list of th example Locking device
90. Status of a device
91. Status instruction sheets
92. Instruction library
93. Application programme
94. Small-scale control
95. Technical device with small-scale control
96. Switching and indicating devices
97. Interface for computer connection
98. Transportable computer

The invention claimed is:

1. A method for controlling a mechanism by a controller, comprising:
   a) defining elementary functions and states of the mechanism according to instructions and signal vectors of sensors and actuators;

starting from a predefined reference state at a beginning of control activation, comparing an actual state of the mechanism transmitted by the sensors with a stored desired state for all elementary functions; and detecting deviation in the mechanism from the desired state according to the instructions;

b) applying an updated elementary instruction for changing the state of the mechanism;

updating the desired state for the comparison and monitoring a time period until acknowledgment of an updated state responsive to both the updated instruction and stored permissible control time periods; and c) identifying states of elementary functions with sensor signals and comparable information;

changing state through the elementary instructions;

assigning as a desired state signals from the sensors and the actuators; and defining application instructions on logical-functional language level by assignment of elementary instructions.

2. The method of claim 1, further comprising:

defining a program module comprising an EF-controller for managing the states of the elementary functions as ordered actual desired states and as current actual states from the actuators and the sensors;

detecting change in the state of the mechanism through the sensors and assigning the state change to the elementary function as current actual state; and comparing the current actual state with the desired state.

3. The method of claim 2, wherein:

a) transferring, for a detected actual state of an elementary function that differs rom the desired state, a signal vector that describes the actual state to a program module comprising a not-desired state evaluator;

b) storing, in the not-desired state evaluator, reaction instructions for predetermined states of elementary functions that are responsive to the transferred state; and c) producing error messages that indicate a name of the predetermined elementary function and a deviating signal.

4. The method of claim 3, further comprising:

assigning and classifying, to an application instruction as an instruction set, the updated desired states of the sensors and actuators, control times for the updated desired state and reaction to deviations instructions, in each case, as reaction instructions for predetermined state messages;

deleting said instruction set and set prior to the start and after the execution, respectively;

applying a predetermined program module of the control comprising an instruction starter for organizing the system and releasing a subsequent instruction when instruction sequences after an execution message of a previous instruction are effected; and organizing parallel instructions by temporary opening parallel execution sequences.

5. The method of claim 4, further comprising:

a) providing a program module comprising a state monitor for integrating sensor signals and preselected controllable information into a continuous data word; and maintaining assigned to the signal the address of a preselected elementary function in the EF-controller;

b) comparing each desired signal with the actual signal of the sensor message;

c) updating, by the module state monitor for a detected deviation of an actual signal, the actual signal in the EF-controller as the updated actual state of an elementary function;

d) entering, after the updating and transmission for evaluation in the EF-controller, the updated signal as an updated comparison state in the state monitor so that a comparison in the state monitor is made to the state evaluated last and each change in state is evaluated once;

e) comparing the desired and actual signals in the state monitor directionally; and comparing, after an interruption for the evaluation of a deviation, at the signal succeeding the interruption place, so that each state change is detected and evaluated.

6. The method of claim 5, further comprising:

a) entering and storing each recorded state change by the program module state monitor in an event-time protocol; and b) detecting and filtering signal vibrations.

7. The method of claim 6, further comprising:

a) providing a subdomain execution computer with the instruction starter, EF-controller, not-desired state evaluator and state monitor after transmission of an elementary instruction to the instruction starter, said computer including no check for permissibility;

b) determining the execution of a received instruction by program modules assigned to the execution computer;

c) providing a subdomain instruction computer of the control blocking;

providing, in said instruction computer, lists for mutually exclusive states;

managing said lists on a logical-functional instruction level;

determining a proportion of functional blockings;

d) providing, in an application instruction in addition to changable elementary functions, information for setting or deleting preselected instructions blockings in the blocking list during or after the execution of the application instruction.

8. The method of claim 7, wherein the execution computer and the instruction computer work decoupled in time by one program step, the method further comprising:

a) executing, in the executing part of the control comprising the execution computer, a received instruction;

checking, in an instruction-managing part of the control comprising the instruction computer, a subsequent instruction available to the executing part comprising the execution computer in an intermediate storage as instruction buffer;

b) updating, after provision of an instruction in the instruction buffer of the execution computer, the state in the instruction computer to the condition that will be after the execution of the instruction; and checking the expected state of the then subsequent instruction for permissibility in the instruction computer during the execution of the preceding instruction; and c) resetting the checked instruction from the buffer instruction if the expected state does not appear; and updating the system to error state.

9. The method of claim 8, wherein application instructions are prepared by steps comprising:

a) assigning, to the application, functionally definable instructions close to the process by language from the previously defined elementary instructions;

said elementary instructions being single, parallel or as a sequence;
b) defining, in the blocking list in the instruction computer, the blocking conditions on instruction level for the updating when activating the application instruction;
c) determining the reaction instructions for preselected deviations and determining error messages, and
d) filing the information in an instruction library; and applying the instruction contents for application instructions.

10. The method of claim 9, further comprising:
determining, from an application program for the operation of the mechanism, the sequence of defined application instructions, determining whether instructions are executed sequentially or in parallel.

11. A method for the development of control software for a mechanism by a controller, comprising providing a dialogue system and further comprising:
a) requesting data of hierarchical function structure for the description of the controllable system;
b) defining each lower end of the hierarchical structure as an elementary function and defining each elementary function with an instruction states in a dialogue;
c) assigning, according to the elementary instructions, signals of sensors, signals of actuators, control times for transition between the states, and a reference state;
d) integrating partial systems being as elementary functions;
e) requiring, in the dialogue system, only the primary data listed on the structure and elementary functions for the description of the functionality of the mechanism.

12. The method of claim 11, further comprising establishing and generating, by the dialogue-guided development system after entry of primary data:
a) a system elementary instruction storage;
b) the EF-controller; and
c) desired signal vector and the actual signal vector for the state monitor so that the mechanism is checkable for error-free signal definition in the reference state and controllable with defined elementary functions in a state of putting into operation.

13. The method of claim 12, further comprising limiting changes of information on structure and elementary functions to an editing level.

14. The method of claim 13, wherein the development system for the definition of application instructions in preselected dialogues performs the steps of:
a) offering elementary instructions of the system for assignment;
b) requesting blocking conditions for the blocking list;
graphically providing the data for the requested blockings through selection in the function structure;
providing formulations of blocking determinations;
c) determining reaction instructions for errors; and
d) storing, classifying and managing determinations in the instruction library.

15. The method of claim 14, further comprising:
a) locally limiting changes of elementary functions;
b) providing for the entering, extending or changing updated application instructions, blocking conditions in the blocking list or error reactions by reaction instructions;
c) updating definitions of application instructions and instruction conditions for the system without any reaction on already defined programs;
said definitions being differentiated by the assignment of status information.

16. An apparatus for controlling a mechanism, comprising
a) a plurality of domains, each domains being configured dependent on features of predetermined events;
b) an execution computer;
a plurality of program modules, each module being configured for a predetermined time-critical events;
the computer comprising an instruction starter, an EF-controller, a not-desired state evaluator and a state monitor;
c) the execution computer including a processor for the time-critical events;
d) sensors and actuators, the execution computer communicating with controllable devices through the sensors, activation of the actuators, desired/actual state comparison, reactions to deviations of the actual state from the desired state and execution of a received instruction;
e) a processor for management of application instructions in instruction libraries, management of blocking lists, execution of application programs by step-by-step transmission of instructions to the execution computer and external communication from the domain of a device comprising an instruction computer, and
f) a domain application computer.

17. The apparatus of claim 16, further comprising:
a) a control hardware module having fixed instruction sets, the execution computer and the instruction computer being included in the control hardware module;
b) switching and indication devices for operation and communication; and
c) an interface for coupling with an external computer for entering control software.

* * * * *